United States Patent  
Takenaka

(10) Patent No.: US 10,379,798 B2  
(45) Date of Patent: Aug. 13, 2019

(54) INFORMATION PROCESSING APPARATUS THAT OBTAINS AND DISPLAYS SYNCHRONIZED SETTING INFORMATION, CONTROL METHOD THEREFOR, AND STORAGE MEDIUM

(71) Applicant: CANON KABUSHIKI KAISHA, Tokyo (JP)

(72) Inventor: Yoko Takenaka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/923,320

(22) Filed: Mar. 16, 2018

(65) Prior Publication Data

US 2018/0275934 A1 Sep. 27, 2018

(30) Foreign Application Priority Data

Mar. 21, 2017 (JP) ................................. 2017-054874  
Jan. 19, 2018 (JP) ................................. 2018-007592

(51) Int. Cl.
*G06F 3/12* (2006.01)  
*H04N 1/00* (2006.01)

(52) U.S. Cl.  
CPC .......... *G06F 3/1258* (2013.01); *G06F 3/1204* (2013.01); *G06F 3/1205* (2013.01); *H04N 1/00244* (2013.01); *H04N 1/00411* (2013.01); *H04N 2201/0094* (2013.01)

(58) Field of Classification Search  
None  
See application file for complete search history.

(56) References Cited

U.S. PATENT DOCUMENTS

| 9,232,004 | B2 | 1/2016 | Kasatani |
| 9,596,382 | B2 | 3/2017 | Maeda et al. |
| 2002/0051200 | A1* | 5/2002 | Chang ................. H04L 12/2805 358/1.15 |
| 2009/0128844 | A1* | 5/2009 | Kondo ............... H04N 1/00244 358/1.15 |
| 2014/0300920 | A1* | 10/2014 | Hayashi ............. H04N 1/00413 358/1.14 |

(Continued)

FOREIGN PATENT DOCUMENTS

| JP | 2009225368 A | 10/2009 |
| JP | 2016010005 A | 1/2016 |

*Primary Examiner* — Miya J Williams  
(74) *Attorney, Agent, or Firm* — Rossi, Kimms & McDowell LLP

(57) ABSTRACT

The present information processing apparatus obtains synchronous data related to an authenticated user from a setting value management server 110, which is an external apparatus, and upon completion of the obtainment of the synchronous data, determines whether a screen related to the synchronous data has been displayed on a display. Furthermore, if the screen related to the synchronous data has been displayed on the display, the information processing apparatus reflects the synchronous data in this screen upon accepting a predetermined operation from the user. On the other hand, if the screen related to the synchronous data is not displayed on the display, the information processing apparatus reflects the synchronous data when displaying the screen on the display.

10 Claims, 17 Drawing Sheets

(56) References Cited

U.S. PATENT DOCUMENTS

| | | | | |
|---|---|---|---|---|
| 2015/0029539 A1* | 1/2015 | Kim | ............... | G06K 15/005 |
| | | | | 358/1.15 |
| 2015/0153969 A1* | 6/2015 | Okayama | .............. | G06F 3/1204 |
| | | | | 358/1.15 |
| 2015/0355916 A1* | 12/2015 | Inoue | ................. | G06F 9/44505 |
| | | | | 713/100 |
| 2015/0373216 A1* | 12/2015 | Maeda | ................. | H04N 1/4406 |
| | | | | 358/1.14 |
| 2016/0014285 A1* | 1/2016 | Nakahara | .......... | H04N 1/00928 |
| | | | | 358/1.13 |
| 2016/0142569 A1* | 5/2016 | Akuzawa | .......... | H04N 1/00511 |
| | | | | 715/734 |
| 2016/0191669 A1* | 6/2016 | Hatada | ................... | H04L 67/34 |
| | | | | 709/220 |
| 2017/0094121 A1* | 3/2017 | Mizuno | ................... | G06F 21/45 |
| 2017/0289369 A1* | 10/2017 | Okayama | .............. | G06F 3/1204 |

\* cited by examiner

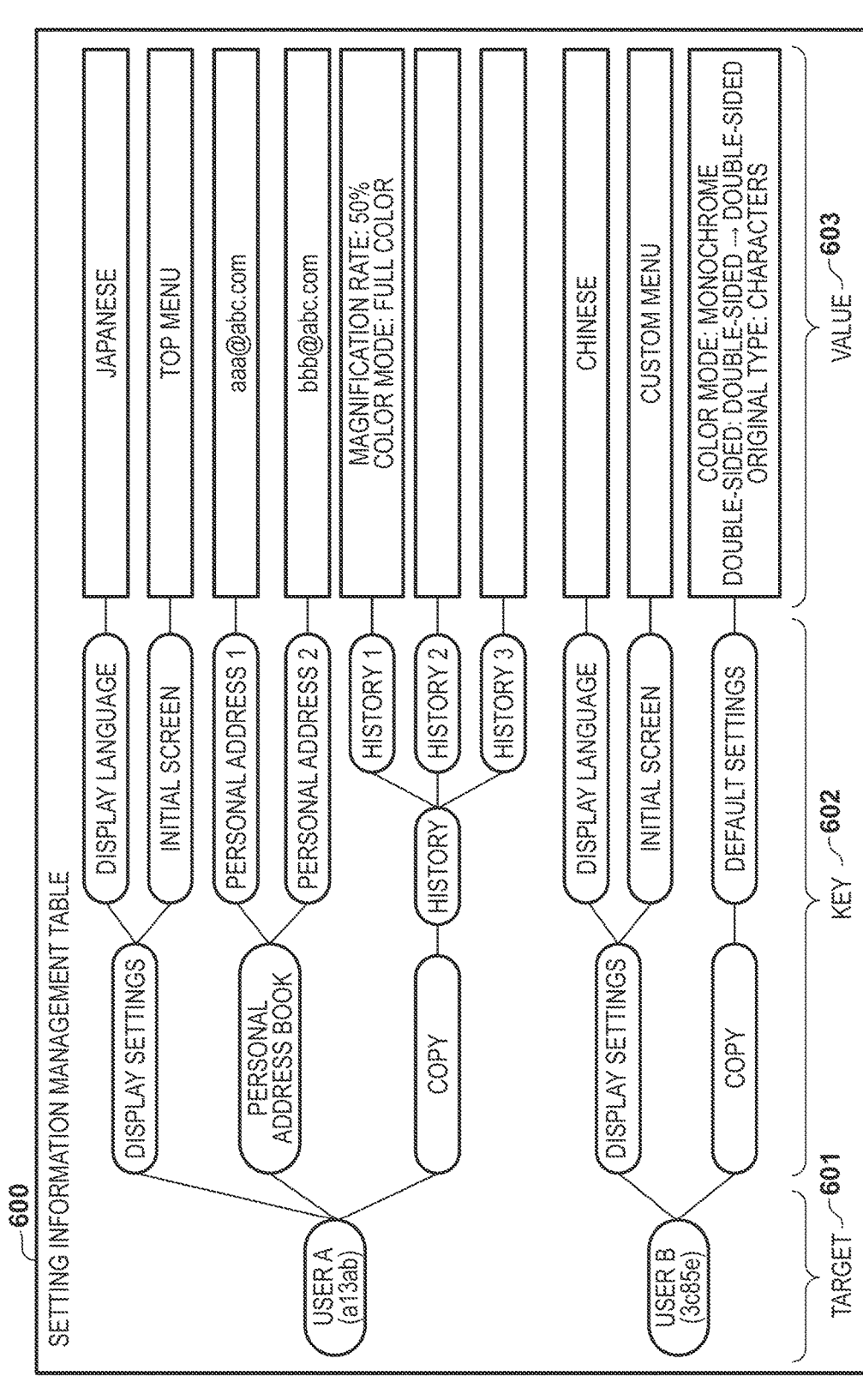

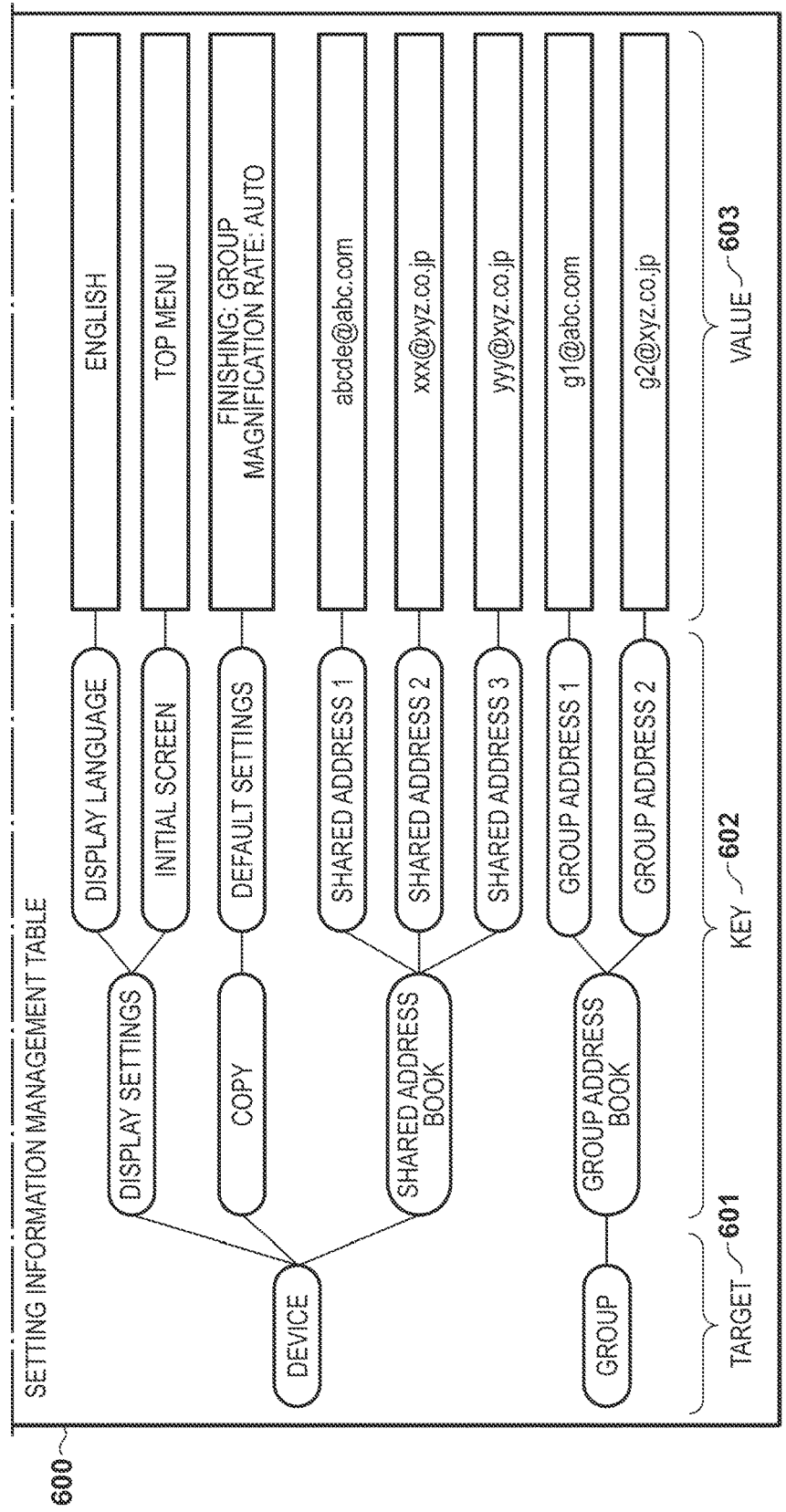

F I G. 7

| USER IDENTIFICATION | LAST SYNCHRONIZATION DATE/TIME | SIZE | USER NAME | DOMAIN NAME | LAST LOGIN DATE/TIME |
|---|---|---|---|---|---|
| a13ab | 2016/01/15 13:28:40 | 10MB | yamada | work1 | 2016/01/20 15:32:04 |
| 3c85e | 2016/02/01 17:53:31 | 5MB | suzuki | work2 | 2016/2/2 08:01:43 |
| 13aa9c | 2015/11/30 09:11:26 | 0.1MB | tanaka | work1 | 0 |
| ... | ... | ... | ... | ... | |

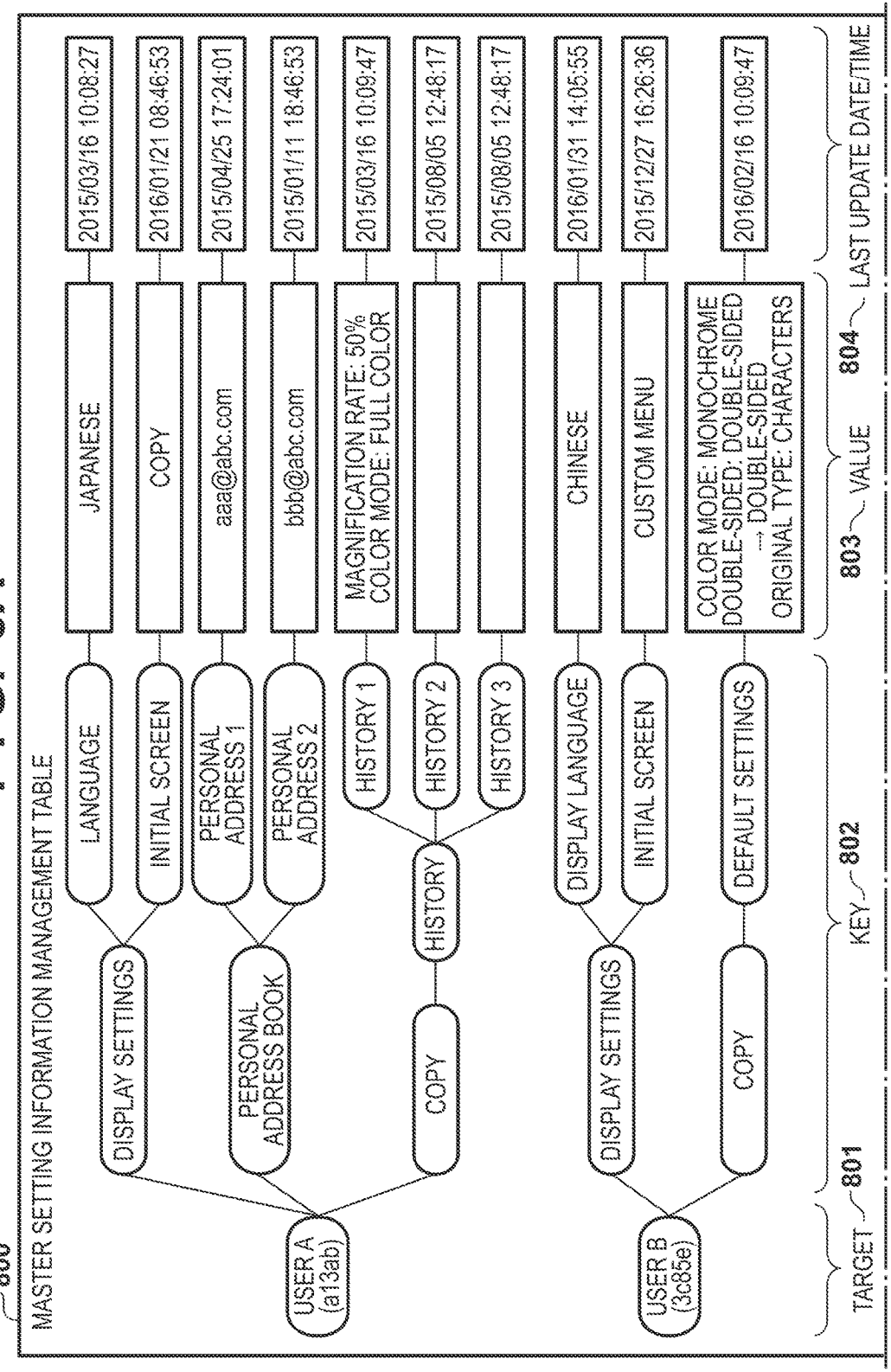

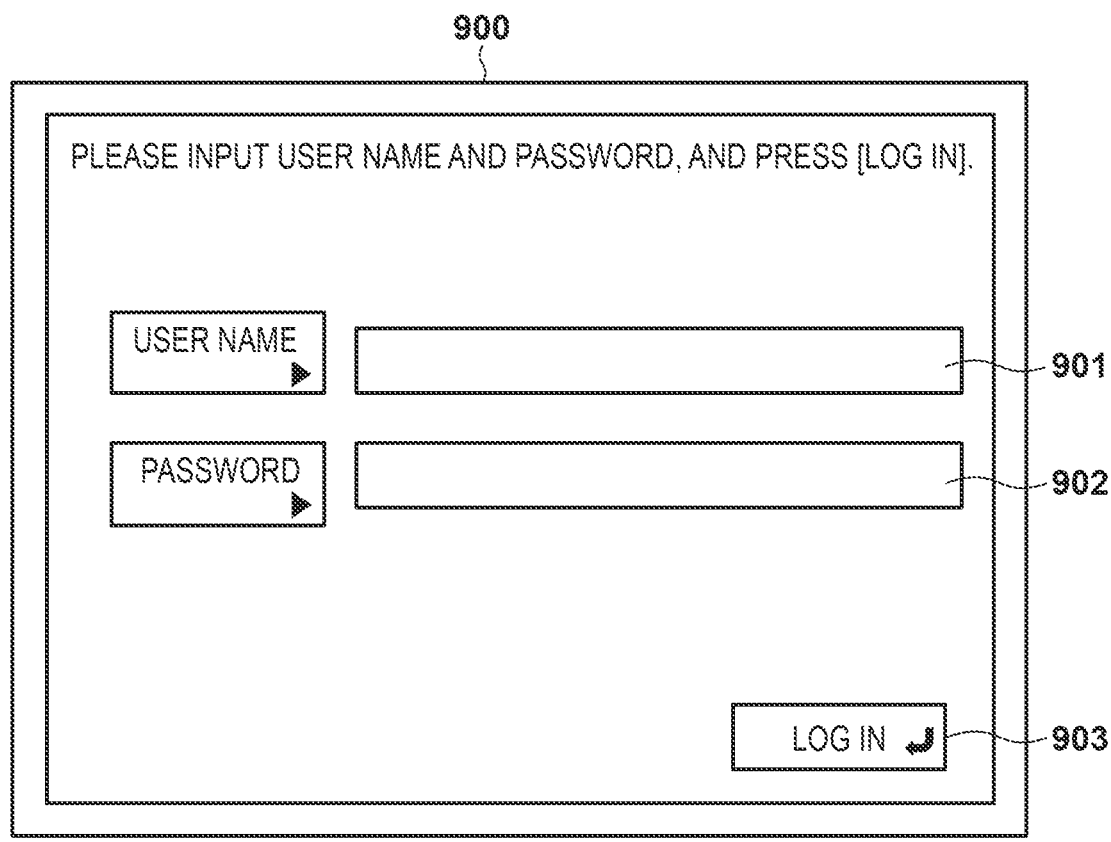

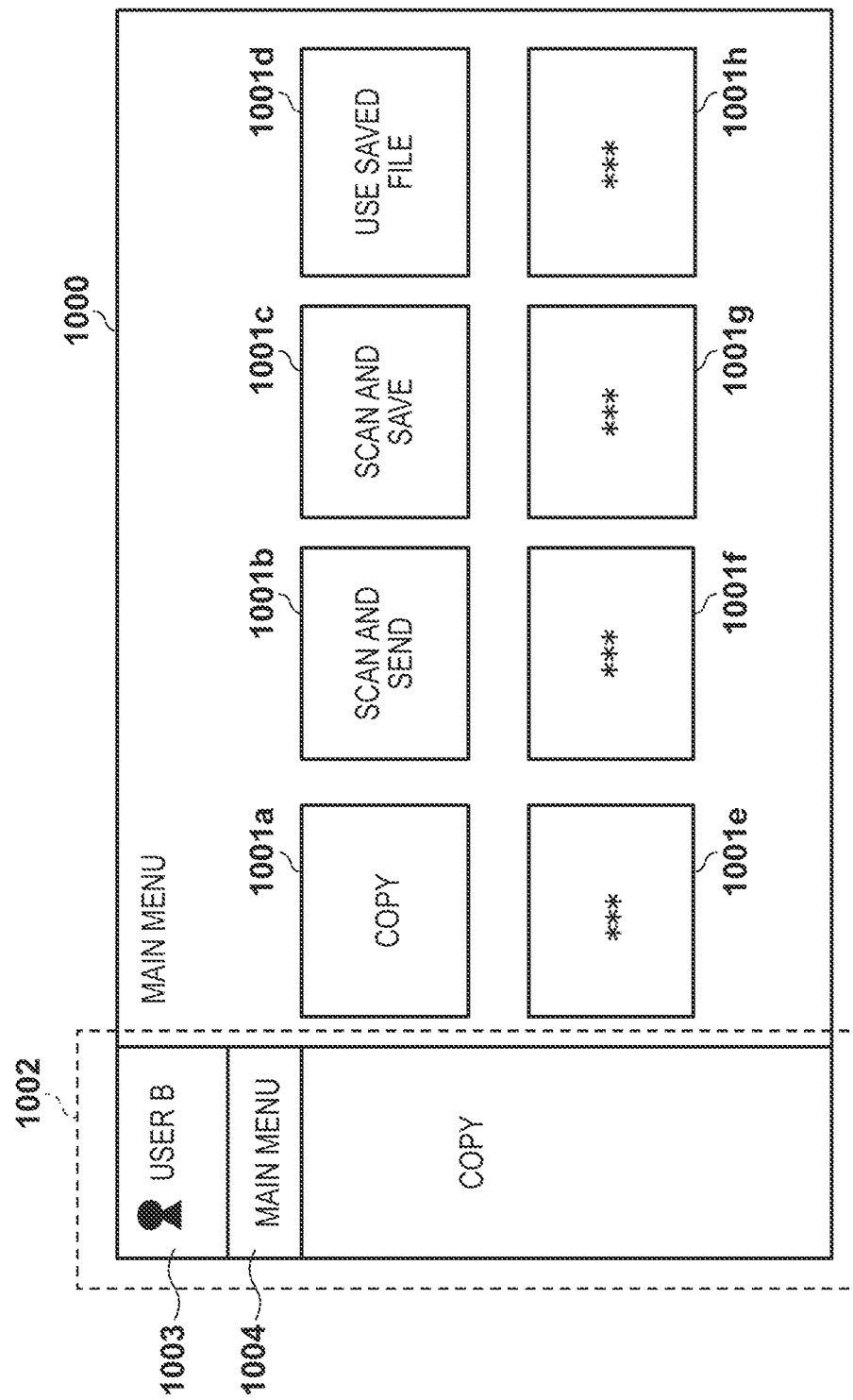

F I G. 15
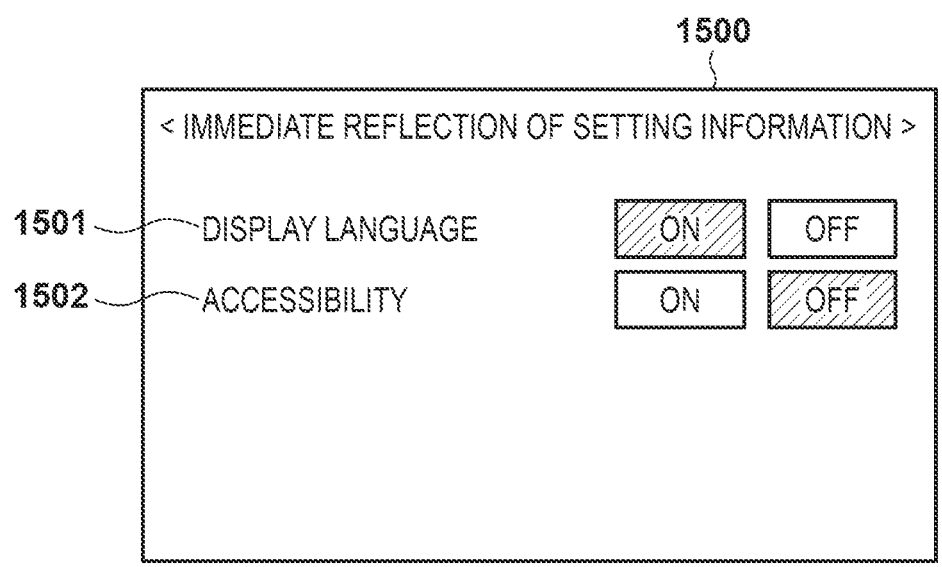

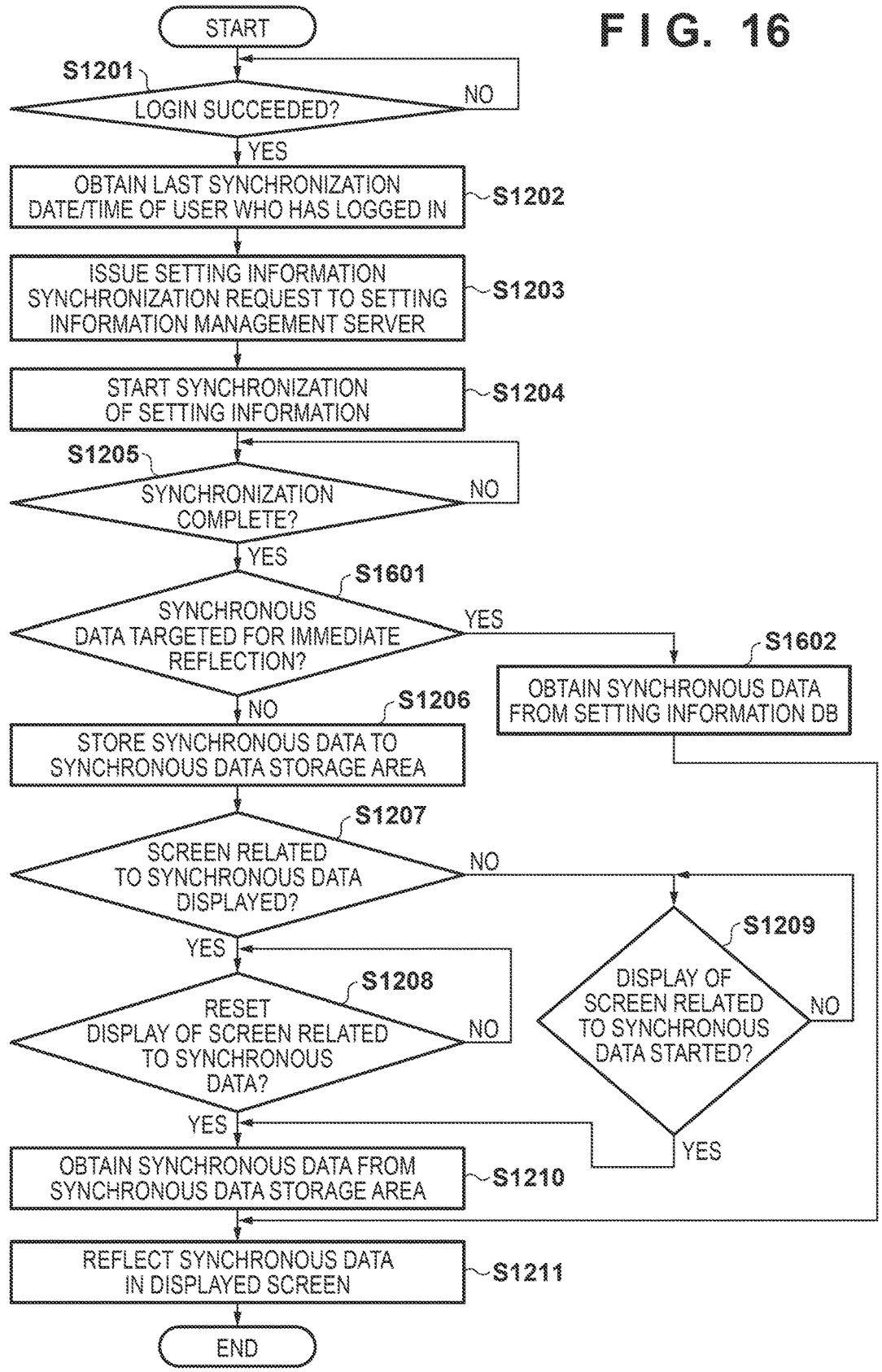

INFORMATION PROCESSING APPARATUS THAT OBTAINS AND DISPLAYS SYNCHRONIZED SETTING INFORMATION, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

There are known techniques in which a plurality of information processing apparatuses (e.g., image forming apparatuses), which are communicably connected with one another via a network, share per-user personal setting information of users of these plurality of information processing apparatuses. For example, Japanese Patent Laid-Open No. 2009-225368 suggests a technique to copy and hold personal setting information in each information processing apparatus for the purpose of sharing, and the personal setting information is shared (synchronized) among the information processing apparatuses.

Furthermore, image forming apparatuses are known that can hold, on a per-user basis, personal setting information that has been set to enable each user to easily use the image forming apparatuses. For example, Japanese Patent Laid-Open No. 2016-10005 suggests image forming apparatuses that obtain personal setting information stored in a server and reflect the personal setting information when a user has logged in. Specifically, when personal setting information of a user has been obtained from the server within a set period after the user's login, each image forming apparatus reflects the obtained personal setting information. On the other hand, when personal setting information of a user has not been obtained from the server within a set period after the user's login, each image forming apparatus does not reflect the obtained personal setting information. In this way, time is not spent on the user's login.

However, the aforementioned conventional techniques have the following problems. For example, the information processing apparatuses according to the aforementioned conventional techniques may take time in login processing while waiting for synchronization of personal setting information from a server. In a case where personal setting information is obtained from a server and reflected when a user logs in, there is a possibility that the login takes time depending on the status of the load on the server and a network due to, for example, the size of the personal setting information, restrictions on a network bandwidth, etc.

Furthermore, when setting information cannot be obtained from a server within a set period, the information processing apparatuses according to the aforementioned conventional techniques cannot reflect the content of the latest personal setting information managed in the server. Meanwhile, in a case where the content of setting information is reflected at a timing of completion of obtainment of the setting information from a server, the content of the latest personal setting information can be reflected, but the following problems exist.

Specifically, when the reception of setting information from a server is completed while a user is executing an operation on an information processing apparatus after logging into the information processing apparatus, if the received settings are reflected immediately, then the settings configured by the user operation will be overwritten by the received settings. For example, after the user has set double-sided print settings of copy to be executed next, if default values of the double-sided print settings are received from the server before the execution of copy, reflecting these default values immediately will not allow copy processing intended by the user to be executed. If the settings are reflected at a wrong timing in the foregoing manner, a job will be processed in accordance with the settings that are not intended by the user, or it will be necessary to ask the user to reconfigure the settings.

SUMMARY OF THE INVENTION

The present invention enables realization of a mechanism that, in a system capable of obtaining setting information corresponding to a user from an external apparatus, reflects the setting information in a quick and favorable manner without inhibiting a user operation.

One aspect of the present invention provides an information processing apparatus, comprising: a memory device that stores a set of instructions; and at least one processor that executes the instructions to: authenticate a user, obtain synchronous data related to the authenticated user from an external apparatus, upon completion of obtainment of the synchronous data, determine whether a screen related to the synchronous data has been displayed on a display, and in a case where the screen related to the synchronous data has been displayed on the display, reflect the synchronous data in the screen upon accepting a predetermined operation from the user, and, in a case where the screen related to the synchronous data has been not displayed on the display, reflect the synchronous data when displaying the screen on the display.

Another aspect of the present invention provides a control method for an information processing apparatus, the control method comprising: authenticating a user; obtaining synchronous data related to the user authenticated in the authenticating from an external apparatus, upon completion of obtainment of the synchronous data in the obtaining, determining whether a screen related to the synchronous data has been displayed on a display, and performing control to, in a case where the screen related to the synchronous data has been displayed on the display, reflect the synchronous data in the screen upon accepting a predetermined operation from the user, an, in a case where the screen related to the synchronous data is not displayed on the display, reflect the synchronous data when displaying the screen on the display.

Still another aspect of the present invention provides a computer-readable storage medium storing a computer program for causing a computer to execute each step in a control method for an information processing apparatus, the control method comprising: authenticating a user; obtaining synchronous data related to the user authenticated in the authenticating from an external apparatus, upon completion of obtainment of the synchronous data in the obtaining, determining whether a screen related to the synchronous data has been displayed on a display, and performing control to, in a case where the screen related to the synchronous data has been displayed on the display, reflect the synchronous data in the screen upon accepting a predetermined operation from the user, whereas in a case where the screen related to the synchronous data is not displayed on the display, reflect the synchronous data when displaying the screen on the display.

Further features of the present invention will be apparent from the following description of exemplary embodiments with reference to the attached drawings.

BRIEF DESCRIPTION OF THE DRAWINGS

FIGS. 6A and 6B are a diagram showing examples of setting information according to an embodiment.

FIG. 7 is a diagram showing an example of a registered user management table according to an embodiment.

FIGS. 8A and 8B are a diagram showing examples of master setting information according to an embodiment.

FIG. 9 is a diagram showing an example of a login screen according to an embodiment.

FIG. 10 is a diagram showing an example of a main menu screen according to an embodiment.

FIG. 15 is a diagram showing an example of a selection screen according to an embodiment.

FIG. 16 is a flowchart showing an example of processing of the MFPs for making a determination on immediate reflection of synchronization in the system according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of System>

Figure 1:
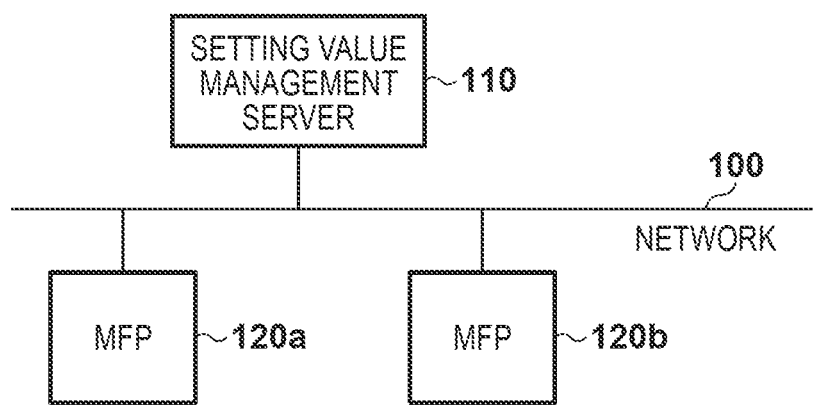
FIG. 1 is a diagram showing an example of a system configuration of a system according to an embodiment.

The following describes a first embodiment of the present invention. First, an exemplary configuration of a system according to the present embodiment will be described with reference to FIG. 1. The present system includes a setting value management server 110, an MFP 120a, and an MFP 120b. The setting value management server 110, MFP 120a, and MFP 120b are communicably connected with one another via a network 100. Although the system according to the present embodiment includes two MFPs, namely the MFP 120a and the MFP 120b, it may be configured to include three or more MFPs. Furthermore, hereinafter, the MFP 120a and the MFP 120b will be collectively referred to as MFPs 120.

Each MFP 120 is an information processing apparatus, such as an image forming apparatus with a plurality of types of functions (e.g., copy and FAX), and stores therein setting information of users who use this apparatus on a per-user basis. Setting information is information that is used when the information processing apparatuses, such as the MFPs 120, execute various types of functions, and is, for example, information of the font and size of characters displayed on a display and the like, information related to print processing, etc. In the present embodiment, the setting value management server 110 and the MFPs 120 manage setting information on a per-user basis (on a personal basis), on a per-group basis, on a per-device basis, etc. Below, setting information that is managed on a per-user basis (on a personal basis) will be referred to as personal setting information.

In the present embodiment, the system executes synchronization processing with respect to personal setting information between the MFPs 120 and the setting value management server 110. The synchronization processing with respect to setting information denotes processing for updating one of setting information held by the MFPs 120 and setting information held by the setting value management server 110 in accordance with the other setting information serving as newer (the latest) setting information.

The setting value management server 110 is an information processing apparatus, such as a PC and a server apparatus that manage master data of personal setting information used by the MFPs 120. Master data denotes data that serves as a basis of setting information managed by the present system. When the MFPs 120 make a confirmation on an update of personal setting information, if there is the latest personal setting information that is different from the personal setting information held by the MFPs 120, the setting value management server 110 transmits the latest personal setting information to the MFPs 120 via the network 100. When the personal setting information held in the MFPs 120 has been changed, they transmit the changed personal setting information to the setting value management server 110 via the network 100. Upon receiving the changed personal setting information from the MFPs 120, the setting value management server 110 updates values of master data of personal setting information using values of the changed personal setting information that has been received. Furthermore, when the MFPs 120 have received the latest setting information from the setting value management server 110, they update values of the personal setting information held therein using values of the latest personal setting information that has been received in a quick and favorable manner without inhibiting a user operation.

For example, when personal setting information in the MFP 120a has been changed, the MFP 120a transmits the changed personal setting information to the setting value management server 110. Then, the setting value management server 110 updates master data of personal setting information using the changed personal setting information that has been received, and transmits personal setting information corresponding to the updated master data to the MFP 120b. The MFP 120b reflects the received personal setting information in information held therein.

<Configuration of MFPs>

Figure 2:
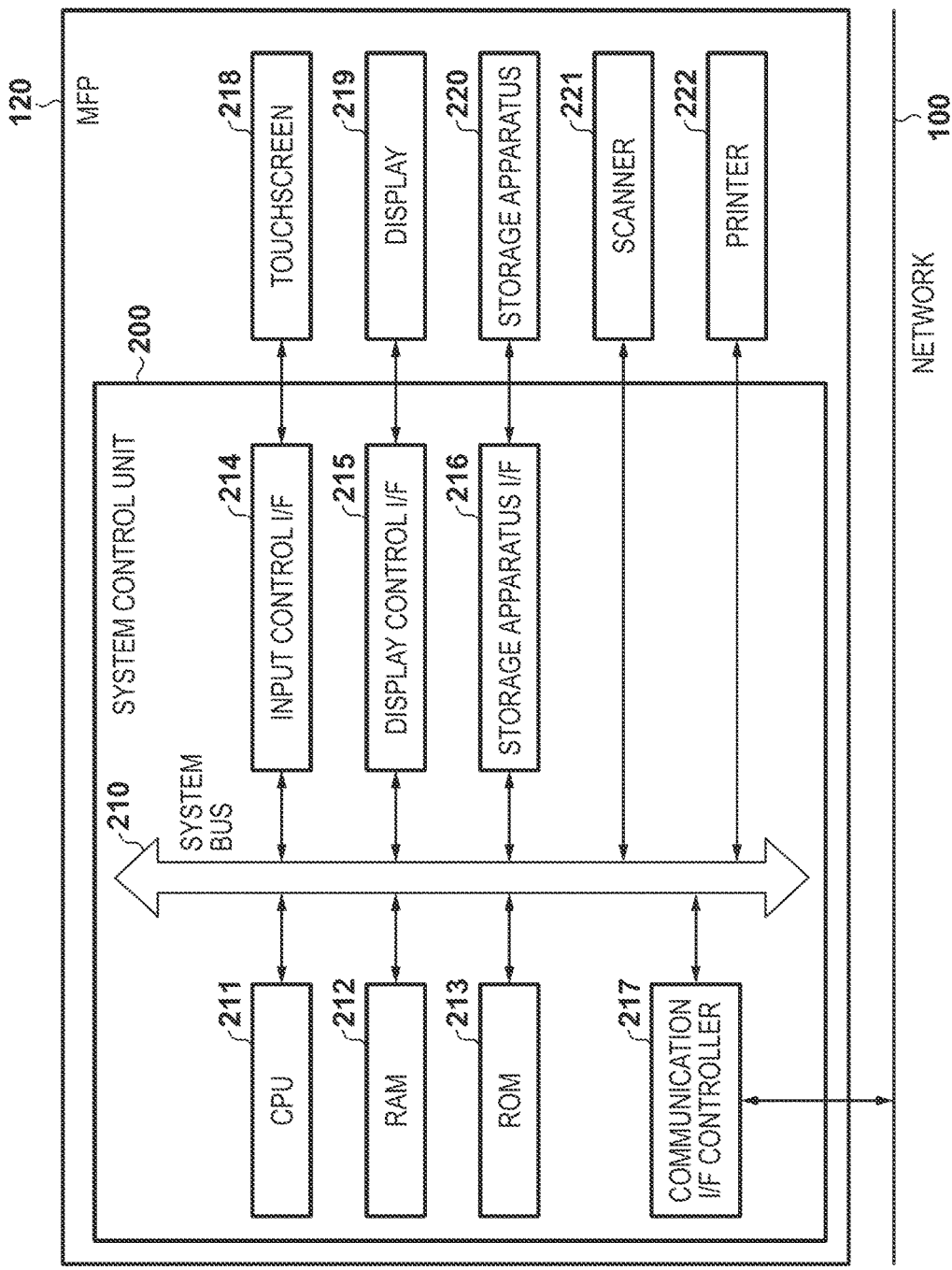
FIG. 2 is a diagram showing an example of a hardware configuration of MFPs according to an embodiment.

Next, an exemplary hardware configuration of the MFPs 120, which are the information processing apparatuses according to the present embodiment, will be described with reference to FIG. 2. The MFPs 120 may include constituent elements (e.g., an optical disc drive, a paper feeding apparatus, etc.) other than the elements shown in FIG. 2. Furthermore, the hardware configuration of the MFPs 120 may be a hardware configuration that is different from FIG. 2 but achieves the advantageous effects similar to those of the present embodiment.

Each MFP 120 includes a system control unit 200, a touchscreen 218, a display 219, a storage apparatus 220, a scanner 221, and a printer 222. Furthermore, the system control unit 200 includes a CPU 211, a RAM 212, a ROM 213, an input control I/F (interface) 214, a display control I/F 215, a storage apparatus I/F 216, and a communication I/F controller 217. The CPU 211, RAM 212, ROM 213, input control I/F 214, display control I/F 215, storage apparatus I/F 216, and communication I/F controller 217 are communicably connected with one another via a system bus 210. The scanner 221 and the printer 222 are also connected to the system bus 210. The elements connected to the system bus 210 can exchange data with one another via the system bus 210.

The CPU 211 is a central arithmetic apparatus, such as a central processing unit, that executes processing for controlling the MFP 120, calculating and processing data, etc. The RAM 212 is a volatile memory, such as a random-access memory, and is used as a temporary storage area, such as a main memory and a working area, for the CPU 211. The ROM 213 is a nonvolatile memory, such as a read-only memory, and stores various types of programs, various types of data, and the like that are used for the operations of the CPU 211 in their respective predetermined areas.

The CPU 211 integrally controls various components of the MFP 120 by, for example, executing programs stored in the ROM 213 using the RAM 212 as a working memory. Programs executed by the CPU 211 are not limited to programs stored in the ROM 213, and the CPU 211 may execute programs stored in the storage apparatus 220.

The input control I/F 214 accepts a user operation via an input device, such as the touchscreen 218, generates a control signal corresponding to the accepted operation, and supplies the control signal to the CPU 211. For example, the input control I/F 214 is connected to an input device that accepts a user operation, examples of which include a character information input device (e.g., a keyboard), a hardware key for directly inputting numerical values and the like, and a pointing device (e.g., the touchscreen 218). The touchscreen 218 is, for example, an input device that is configured to be planar and outputs coordinate information corresponding to a touched position. In the following description of the present embodiment, the MFP 120 is configured to be connected to the touchscreen 218 as an input device; however, it may be configured to be connected to another input device, such as a keyboard. The CPU 211 controls each element of the MFP 120 in accordance with programs based on a control signal that is generated and supplied by the input control I/F 214 in response to a user operation performed on the input device. This enables the CPU 211 to execute processing corresponding to the user operation.

The display control I/F 215 outputs a display signal for displaying an image to a display device (display unit), such as the display 219. For example, the CPU 211 supplies a generated display control signal to the display control I/F 215 in accordance with programs. The display control I/F 215 generates a display signal based on this display control signal, and outputs the display signal to the display 219. For example, the display control I/F 215 causes the display 219 to display a GUI screen composing a GUI (Graphical User Interface) based on the display control signal generated by the CPU 211.

The touchscreen 218 may be configured integrally with the display 219. For example, the touchscreen 218 may be configured in such a manner that its light transmittance does not obstruct the presentation on the display 219, and attached to a layer above a display surface of the display 219. In this way, input coordinates on the touchscreen 218 are associated with display coordinates on the display 219. This enables the MFP 120 to configure a GUI with which a user can directly operate a screen displayed on the display 219.

The storage apparatus 220, which is composed of, for example, an HDD (Hard Disk Drive), a flash memory, and the like, is connected to the storage apparatus I/F 216. The CPU 211 reads out data from the storage apparatus 220, and writes data to the storage apparatus 220. The CPU 211 may use the storage apparatus 220 in place of the RAM 212 and the ROM 213. Furthermore, the storage apparatus 220 is not limited to being composed of one storage apparatus, and may be composed of a plurality of storage apparatuses of different types.

Under control of the CPU 211, the communication I/F controller 217 communicates with the network 100 that is composed of, for example, various types of networks, such as a LAN, the Internet, a wired network, and a wireless network. A variety of apparatuses, such as a PC, another MFP, a printer, and a server, are connected to the network 100 in such a manner that they can communicate with the MFP 120. The CPU 211 also communicates with an external authentication server via the communication I/F controller 217.

Under control of the CPU 211, the scanner 221 reads an original and generates image data corresponding to the read original. For example, in response to a user instruction input via the input control I/F 214, the CPU 211 instructs the scanner 221 to execute scan processing. The scanner 221 reads an original placed on a platen or an ADF (Auto Document Feeder), and generates image data by converting the original into digital data. Then, the scanner 221 stores the generated image data to the storage apparatus 220 via the storage apparatus I/F 216.

Under control of the CPU 211, the printer 222 applies print processing to image data saved in the storage apparatus 220. For example, the CPU 211 instructs the printer 222 to execute print processing in response to a user instruction input via the input control I/F 214 and a command instruction input from an external apparatus via the communication I/F controller 217. The printer 222 reads out image data from the storage apparatus 220, converts the image data into a printable data format, and prints the conversion result on a paper original. Processing of later-described flowcharts and the like is realized by the CPU 211 executing processing based on programs stored in the ROM 213 or the storage apparatus 220.

<Configuration of Setting Value Management Server>

Figure 3:
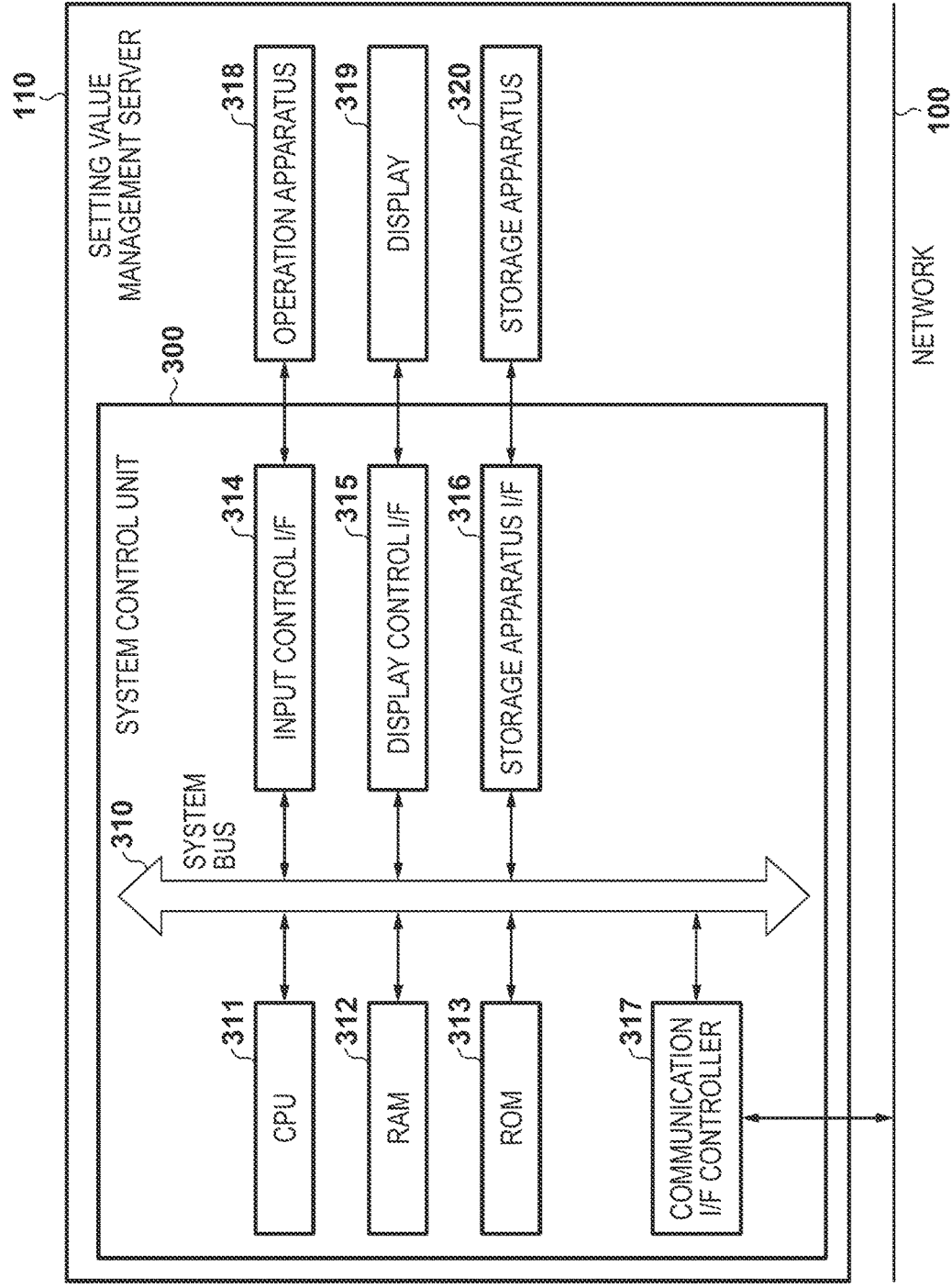
FIG. 3 is a diagram showing an example of a hardware configuration of a setting value management server according to an embodiment.

Next, an exemplary hardware configuration of the setting value management server 110 according to the present embodiment will be described with reference to FIG. 3. The setting value management server 110 may include hardware constituent elements (e.g., an optical disc drive) other than the hardware constituent elements shown in FIG. 3, or may have a hardware configuration that is different from FIG. 3 but achieves the advantageous effects similar to those of FIG. 3.

The setting value management server 110 includes a system control unit 300, an operation apparatus 318, a display 319, and a storage apparatus 320. The system control unit 300 includes a CPU 311, a RAM 312, a ROM 313, an input control I/F 314, a display control I/F 315, a storage apparatus I/F 316, and a communication I/F controller 317. The CPU 311, RAM 312, ROM 313, input control I/F 314, display control I/F 315, storage apparatus I/F 316, and communication I/F controller 317 are communicably connected with one another via a system bus 310.

The CPU 311 is a central arithmetic apparatus that controls various apparatuses, and calculates and processes data. The RAM 312 is a volatile memory, and functions as a temporary storage area, such as a main memory and a working area, for the CPU 311. The ROM 313 is a non-volatile memory, and stores various types of programs, various types of data, and the like that are executed by the CPU 311 in their respective set areas. The CPU 311 controls each element of the setting value management server 110 in accordance with, for example, programs stored in the ROM 313 using the RAM 312 as a working memory. The CPU 311 may execute not only programs stored in the ROM 313, but also programs stored in the storage apparatus 320. Later-described functions, processing, and the like are realized by the CPU 311 executing processing based on programs stored in the ROM 313 or the storage apparatus 320.

The input control I/F 314 accepts a user operation via an input device, such as the operation apparatus 318, generates a control signal corresponding to the operation, and supplies the control signal to the CPU 311. For example, the input control I/F 314 is connected to an input device that accepts a user operation, examples of which include a character information input device (e.g., a keyboard), a hardware key for directly inputting numerical values and the like, and the operation apparatus 318 composed of a pointing device (e.g., a touchscreen) and the like. The CPU 311 controls each element of the setting value management server 110 in accordance with programs based on a control signal that is generated and supplied by the input control I/F 314 in response to a user operation performed on the input device. This enables the CPU 311 to execute processing corresponding to the user operation.

The display control I/F 315 outputs a display signal for displaying an image to a display device, such as the display 319. For example, the CPU 311 supplies a generated display control signal to the display control I/F 315 in accordance with programs. The display control I/F 315 generates a display signal based on this display control signal, and outputs the display signal to the display 319. For example, the display control I/F 315 causes the display 319 to display a GUI screen composing a GUI based on the display control signal generated by the CPU 311.

The storage apparatus 320, which is composed of, for example, an HDD, a flash memory, and the like, is connected to the storage apparatus I/F 316. The CPU 311 reads out data from the storage apparatus 320, and writes data to the storage apparatus 320. The CPU 311 may use the storage apparatus 320 in place of the RAM 312 and the ROM 313.

Under control of the CPU 311, the communication I/F controller 317 communicates with the network 100 that is composed of, for example, various types of networks, such as a LAN, the Internet, a wired network, and a wireless network. A variety of apparatuses, such as a PC, an MFP, a printer, and a server, are connected to the network 100 in such a manner that they can communicate with the setting value management server 110.

Although the setting value management server 110 is described as a server apparatus in the present embodiment, it may be an MFP that has a hardware configuration similar to that of the MFPs 120.

<Functional Components of MFPs>

Figure 4:
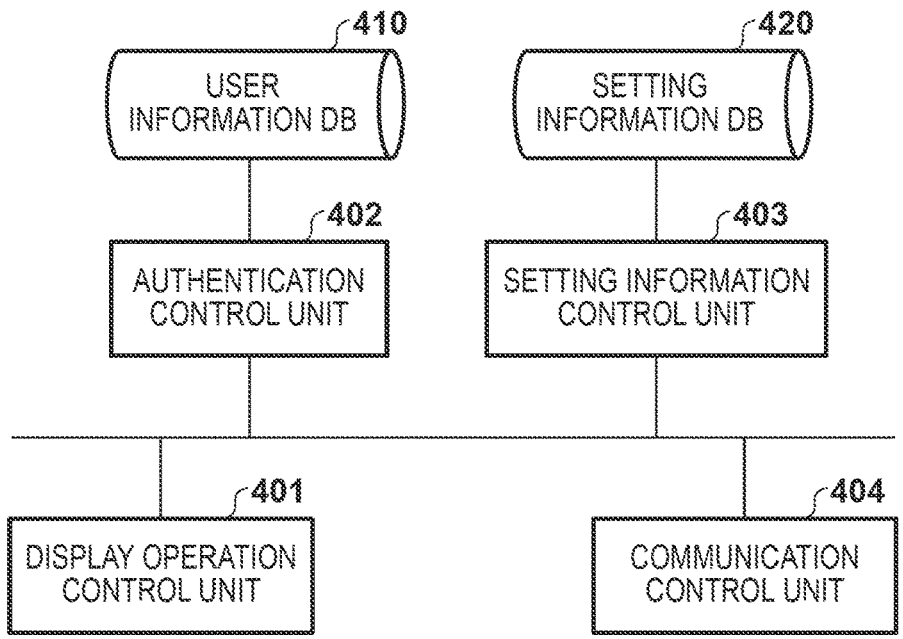
FIG. 4 is a diagram showing examples of functional components and the like of the MFPs according to an embodiment.

Next, examples of functional components and the like of each MFP 120 according to the present embodiment will be described with reference to FIG. 4. Each MFP 120 includes a display operation control unit 401, an authentication control unit 402, a setting information control unit 403, and a communication control unit 404 as functional components. The functional constituent elements of each MFP 120 can exchange information with one another. The MFP 120 may include functional constituent elements (e.g., a print control unit that controls print processing and the like) other than the functional constituent elements shown in FIG. 4. Furthermore, the MFP 120 may include functional components that are different from FIG. 4 but achieve the advantageous effects similar to those of the MFP 120 according to the present embodiment. Programs for realizing the functions of the functional constituent elements shown in FIG. 4 are stored in, for example, the ROM 213, deployed to the RAM 212 as necessary at the time of activation, during use of the functions, and the like, and executed by the CPU 211. Furthermore, the MFP 120 has at least one of the functions of copy, scan, FAX, etc. Each function or operation of the MFP 120 is realized by a functional constituent element that controls that function or operation. For example, the MFP 120 includes functional constituent elements serving as a copy control unit, a scan control unit, and a transmission control unit in correspondence with the functions of copy, scan, and information transmission, respectively. The MFP 120 includes other functional constituent elements corresponding to the functions and operations related to processing of the MFP 120 in addition to the functional constituent elements shown in FIG. 4.

Under control of the CPU 211, the display operation control unit 401 controls the input control I/F 214 and the display control I/F 215. For example, based on an instruction from another functional constituent element, the display operation control unit 401 displays an image on the display 219 via the display control I/F 215, and obtains operation information that has been input to the touchscreen 218 by a user via the input control I/F 214.

Under control of the CPU 211, the authentication control unit 402 executes authentication processing for authenticating a user, and determines whether an operator of the MFP 120 is a valid user of the MFP 120. Hereinafter, execution of the authentication processing with respect to the operator of the MFP 120 and initiation of a session in the case of a valid user will be referred to as a login. Furthermore, the authentication control unit 402 manages a database that stores user information installed in the storage apparatus 220 (hereinafter referred to as a user information DB 410). User information is information for specifying a user, and is, for example, a user identifier, a user name, a domain name, a password, and other information pertaining to a user.

It will be assumed that the authentication control unit 402 authenticates a user based on user information stored in the user information DB 410 inside the MFP 120. However, the authentication control unit 402 may execute the authentication processing for a user by connecting to an external authentication server via the communication I/F controller 217, delegating the authentication processing for the user to the connected external authentication server, and obtaining the authentication result from the external authentication server. The authentication control unit 402 exchanges authentication information with the external authentication server using a known technique.

Furthermore, hereinafter, termination of a session for a user after the user has finished using the MFP 120 will be referred to as a logout. The authentication control unit 402 also provides such functions as registration and deletion of a user, and updating of user information. The authentication control unit 402 may further provide a group function. A group is an assemblage of a plurality of users, and the authentication control unit 402 can register a plurality of groups. A user can belong to 0 or more groups. The authentication control unit 402 further provides such functions as registration and deletion of a group, updating of group information, making a user belong to a group, and withdrawing a user from a group. The authentication control unit 402 stores an identifier that uniquely specifies a user (hereinafter, a user identifier) and an identifier that uniquely specifies a group (hereinafter, a group identifier) to the user information DB 410. The user information DB 410 is recorded in the storage apparatus 220.

The setting information control unit 403 has functions of, for example, registering, obtaining, and changing device setting information and personal setting information. Device setting information is one type of setting information, and is setting information that is referred to by all users. On the other hand, personal setting information is setting information that is referred to only by its user.

The setting information control unit 403 may have functions of, for example, registering, obtaining, and changing group setting information. Group setting information is setting information that can be referred to only by users who belong to its group. The setting information control unit 403 may, for example, use group setting information of a group to which each user belongs in place of personal setting information of that user. Furthermore, the setting information control unit 403 may manage other types of setting information (e.g., client group setting information that is decided on for groups of client apparatuses on a per-group basis) that are different from personal setting information, device setting information, and group setting information.

The setting information control unit 403 manages a database that stores setting information installed in the storage apparatus 220 (hereinafter, a setting information DB 420). The setting information control unit 403 accepts a user input via the touchscreen 218 and a request from the communication control unit 404 and the like, and accesses setting information stored in the setting information DB 420 inside the storage apparatus 220. At this time, based on whether the input is intended for device setting information, personal setting information, or group setting information, the setting information control unit 403 accesses corresponding setting information.

The communication control unit 404 executes processing with respect to the setting value management server 110 via the communication I/F controller 217 in response to an instruction from the setting information control unit 403. The communication control unit 404 obtains the latest setting information stored in the setting value management server 110, and notifies the setting value management server 110 of information updated in the MFP 120 and performs control to register the same. The communication control unit 404 performs communication with the setting value management server 110 using, for example, a known technique, such as a Web API or another communication protocol.

<Functional Components of Setting Value Management Server>

Figure 5:
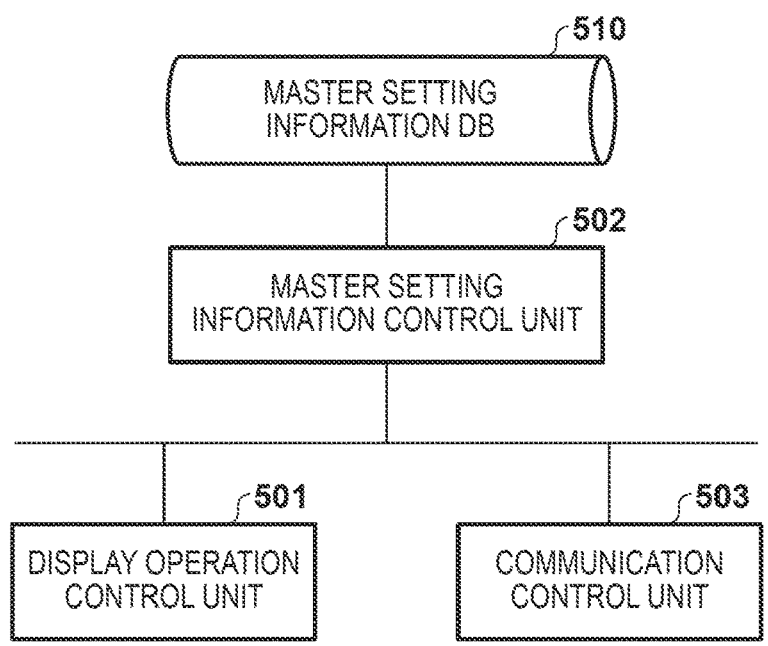
FIG. 5 is a diagram showing examples of functional components and the like of the setting value management server according to an embodiment.

Next, examples of functional components of the setting value management server 110 according to the present embodiment will be described with reference to FIG. 5. The setting value management server 110 includes a display operation control unit 501, a master setting information control unit 502, and a communication control unit 503. The functional constituent elements of the setting value management server 110 can exchange information with one another. The setting value management server 110 may include functional constituent elements (e.g., an operation input control unit that controls an input from the input device) other than the functional constituent elements shown in FIG. 5. Furthermore, the setting value management server 110 may include functional components that are different from FIG. 5 but achieve the advantageous effects similar to those of the setting value management server 110 according to the present embodiment. Programs for realizing the functions of the functional constituent elements shown in FIG. 5 are stored in, for example, the ROM 313, deployed to the RAM 312 as necessary at the time of activation, during use of the functions, and the like, and executed by the CPU 311. The setting value management server 110 includes other functional constituent elements corresponding to the functions and operations related to processing of the setting value management server 110 in addition to the functional constituent elements shown in FIG. 5. For example, the setting value management server 110 includes a functional constituent element for controlling user authentication processing.

Under control of the CPU 311, the display operation control unit 501 controls the input control I/F 314 and the display control I/F 315. For example, based on an instruction from another functional constituent element, the display operation control unit 501 displays an image on the display 319 via the display control I/F 315, and obtains information that has been input to the operation apparatus 318 by a user via the input control I/F 314.

The master setting information control unit 502 has functions of integrating setting information handled by the MFPs 120, which are clients, and registering, obtaining, and changing the setting information. The master setting information control unit 502 manages a master setting information DB 510 that stores master data of setting information of all MFPs 120, which is installed in the storage apparatus 320. The master setting information control unit 502 accepts a request from the MFPs 120 via the communication I/F controller 317 and the communication control unit 503, and accesses setting information stored in the master setting information DB 510.

In response to an instruction from the master setting information control unit 502, the communication control unit 503 transmits the latest setting information stored in the setting value management server 110 to the MFPs 120 via the communication I/F controller 317. The communication control unit 503 also performs control to register setting information updated in the MFPs 120 with the master setting information DB 510. The communication control unit 503 performs communication with the MFPs 120 using, for example, a known technique, such as a Web API or another communication protocol.

<Setting Information Management Table>

Next, an example of a setting information management table 600 stored in the setting information DB 420 according to the present embodiment will be described with reference to FIGS. 6A and 6B. The setting information management table 600 stores setting information about a certain target as a set of information of that target, keys that specify what the information pertains to, and a value of the information. The MFPs 120 manage setting information using the setting information management table 600 shown in FIGS. 6A and 6B. Setting information stored in the setting information management table 600 is expressed as information in a hierarchical structure. Setting information contains information in a hierarchical structure: a target 601, keys 602, and values 603.

The target 601 is information that specifies to which target (a predetermined user, device, group, etc.) that setting information is related. Furthermore, the target 601 is also information that specifies a type of that setting information, for example, whether that setting information is device setting information, personal setting information, or group setting information. The target 601 is a user identifier serving as an identifier that specifies an individual user in the case of personal setting information, and is a group identifier serving as an identifier that specifies an individual group in the case of group setting information.

FIGS. 6A and 6B show an example in which personal setting information of a user A, personal setting information of a user B, device setting information, and group setting information of a group 1 are stored. In the example of FIGS. 6A and 6B, regarding the targets 601, user identifiers of the users A and B are respectively "user A" and "user B", information that specifies a device is "device", and a group identifier of the group 1 is "group 1". Identifications of a device, user, and group are not limited to being presented as the names of their targets, such as "device" and "user A", and may be, for example, character strings that can uniquely specify the targets, such as "a13ab" presented below "user A" in FIGS. 6A and 6B. An example of processing for a case where the user identifiers are character strings, such as "a13ab", will be described later in connection with processing for obtaining personal setting information shown in FIGS. 8A and 8B and processing for registering and updating the personal setting information.

The keys 602 are information that specifies to which setting under which function setting information is related. A combination of a target 601 and keys 602 specifies to which function of which entity (a device, user, group, etc.) setting information is related. A value of setting information corresponding to a target 601 and keys 602 is stored as a value 603. In the example of FIGS. 6A and 6B, a value 603 corresponding to keys 602 "display settings—display language" under a target 601 "user A" is "Japanese". The value "Japanese" of setting information with the keys 602 "display settings—display language" means that the device displays information in Japanese on the display unit to a user. That is to say, the display language that the device displays on the display unit to the user A is Japanese. On the other hand, a value 603 corresponding to keys 602 "display settings—display language" under a target 601 "user B" is "Chinese". Furthermore, a value 603 corresponding to keys 602 "copy—default settings" under a target 601 "user B" is "color mode: monochrome, double-sided: double-sided—double-sided, original type: characters". In this context, default settings for copying denote setting values that are initially set when the operations of a copy application are started.

The setting information DB 420 stores as many pieces of personal setting information as there are users. On the other hand, the setting information DB 420 stores only one piece of device setting information. This is because, for each MFP 120, device setting information to be used is only device setting information related to itself. In the example of FIGS. 6A and 6B, a value 603 corresponding to keys 602 "display settings—display language" in the device setting information is "English".

Regarding group setting information with a target 601 "group 1", a value 603 corresponding to keys 602 "group address book—group address 1" is "g1@abc.com". For example, assume that the user A and the user B belong to the group 1. While the user A and the user B can refer to the group address 1 by logging into the MFPs 120 as the user A or the user B, a user C who does not belong to the group 1 cannot refer to the same.

Some of keys 602 of personal setting information are the same as keys 602 of device setting information, but there are also differences therebetween. When personal setting information and device setting information have the same keys 602, the setting information control unit 403 can use values 603 corresponding to the keys 602 of the device setting information as initial values for values 603 corresponding to the keys 602 of the personal setting information. Furthermore, the setting information control unit 403 can use values of the device setting information as initial values of personal setting information of a newly-registered user. Using the example of FIGS. 6A and 6B, assume that the setting information control unit 403 is about to newly register personal setting information of the user C in a state where the personal setting information of the user C has not been registered yet. In this case, the setting information control unit 403 can decide on "English", which is the value 603 corresponding to the keys 602 "display settings—display language" of the device setting information, as a value 603 corresponding to keys 602 "display settings—display language" of the personal setting information of the user C.

At the time of user login, the setting information control unit 403 searches for a target 601 that is the same as a user identifier specified through the login from the setting information management table 600. Then, the setting information control unit 403 reads in the personal setting information that has been searched for, and reflects the personal setting information that has been read in in the functions and operations of the MFP 120. Therefore, a user can use the MFP 120 that has have been customized in accordance with registered personal setting information for that user. Furthermore, at the time of user logout, the setting information control unit 403 reads in the device setting information from the setting information management table 600, and reflects the same in the functions and operations of the MFP 120. Therefore, in a state where a user has not logged in, the MFP 120 provides the functions and operations that reflect the device setting information.

<Registered User Management Table>

Next, an example of a registered user management table 700 for managing users registered with the MFP 120 according to the present embodiment will be described with reference to FIG. 7. The registered user management table 700 is stored in the setting information DB 420. When a user is registered with the MFP 120, the setting information control unit 403 adds information of the registered user to the registered user management table 700, generates personal setting information for the registered user, and adds the generated personal setting information to the setting information management table 600. That is to say, users registered with the registered user management table 700 are users for whom personal setting information is stored in the MFP 120. The registered user management table 700 is composed of a user identifier 701, a last synchronization date/time 702, a size 703, a user name 704, a domain name 705, and a last login date/time 706.

The user identifier 701 is an identifier that uniquely specifies a user without overlapping with other users in all MFPs included among the plurality of MFPs 120. For example, the setting information control unit 403 may generate a character string representing a combination of a user name and a domain name that are input at the time of login, a hash value generated from the user name and the domain name, and the like as an identifier.

The last synchronization date/time 702 is information that is associated with the user identifier 701 on a per-registered user basis, and indicates the date and time at which the communication control unit 404 obtained the latest personal setting information of each user from the setting value management server 110 and reflected the same. In the present embodiment, the setting value management server 110 and each MFP 120 use synchronized time information. Furthermore, although the setting information control unit 403 uses the date and time at which setting information was received from the setting value management server 110 as the last synchronization date/time 702 in the present embodiment, other date and time may be used as the last synchronization date/time 702. For example, the setting information control unit 403 may use the date and time at which setting information in the setting information management table 600 is updated based on setting information received from the setting value management server 110 as the last synchronization date/time 702.

The size 703 is information that indicates a data size of personal setting information of each user. The user name 704, the domain name 705, and the last login date/time 706 are information of a user name, a domain name, and the date/time of the last login to the MFP 120, respectively, of a user corresponding to the user identifier 701. At every login to the MFP 120, the setting information control unit 403 updates the last login date/time 706 of a user who has logged in using information of the date/time of the login. The last login date/time 706 of a user who has only been registered with the MFP 120 and has not logged into the MFP 120 is 0.

In the present embodiment, the registered user management table 700 includes the user name 704 and the domain name 705. However, for example, in a case where the user identifier is a character string representing a combination of the user name and the domain name, the setting information control unit 403 can obtain the user name and the domain name from the user identifier. The setting information control unit 403 can also obtain the user name and the domain name by making an inquiry to the authentication control unit 402 about the user name and the domain name corresponding to the user identifier. In this case, the registered user management table 700 may not include the user name 704 and the domain name 705.

Furthermore, the setting information control unit 403 may obtain the last login date/time 706 by making an inquiry to the authentication control unit 402 about the last login date/time corresponding to the user name and the domain name. In this case, the registered user management table 700 may not include the last login date/time 706. Furthermore, in a case where the registered user management table 700 includes the user name 704 and the domain name 705 but does not include the user identifier 701, the setting information control unit 403 may generate the user identifier from the user name 704 and the domain name 705 when the user identifier is necessary. Furthermore, the setting information control unit 403 may make an inquiry to the authentication control unit 402 about the user identifier based on the user name 704 and the domain name 705.

<Master Setting Information Management Table>

Next, an example of a master setting information management table 800 according to the present embodiment will be described with reference to FIGS. 8A and 8B. The master setting information management table 800 is a table that stores master data of setting information, and is stored in the master setting information DB 510 of the setting value management server 110. Master data of setting information stored in the master setting information management table 800 is expressed as information in a hierarchical structure, similarly to setting information of the setting information management table 600 shown in FIGS. 6A and 6B. Hereinafter, master data of setting information will be referred to as master setting information. Master setting information contains a target 801, keys 802, and values 803 that respectively correspond to a target 601, keys 602, and values 603. The specifics of the target 801, keys 802, and values 803 are respectively similar to the target 601, keys 602, and values 603.

Unlike the setting information management table 600, the master setting information management table 800 further includes a last update date/time 804 that indicates when each value 803 was updated. A value of the target 801 may be a character string indicating a name of a target, such as "user A" and "device", may be a character string that uniquely specifies a target, such as "a13ab", or may be any information that can uniquely specify an entity. Processing for a case where the value of the target 801 is "a13ab" will be described in connection with processing for obtaining personal setting information and processing for registering and updating personal setting information below.

(Processing for Obtaining Personal Setting Information)

First, a description will be given of processing in which an MFP 120 obtains the latest personal setting information of a user stored in the setting value management server 110.

Once the user has input information necessary for authentication, such as a user name and a password, to the MFP 120, the authentication control unit 402 executes authentication processing for confirming the validity of the input information, and executes processing for allowing the user to log into the MFP 120. Assume that a user identifier of the user who has logged into the MFP 120 is "a13ab". Once the authentication control unit 402 has confirmed the validity of the user and completed the login processing, it requests the setting information control unit 403 for setting information of the user identifier "a13ab".

The setting information control unit 403 obtains, from the registered user management table 700 stored in the setting information DB 420, the last synchronization date/time 702 "2016/01/15 13:28:40" of the user corresponding to the user identifier 701 "a13ab". The setting information control unit 403 instructs the communication control unit 404 to obtain, from the setting value management server 110, personal setting information that was updated on or after the last synchronization date/time "2016/01/15 13:28:40" among personal setting information of the user with the user identifier "a13ab". The communication control unit 404 executes the following processing using the communication I/F controller 217 via the network 100. Specifically, the communication control unit 404 requests the setting value management server 110 for obtainment of personal setting information that was updated on or after "2016/01/15 13:28: 40" in connection with the user A corresponding to the user identifier "a13ab".

Upon receiving the request from the MFP 120, the communication control unit 503 of the setting value management server 110 analyzes the received request. Furthermore, the communication control unit 503 instructs the master setting information control unit 502 to return personal setting information that was updated on or after the last synchronization date/time "2016/01/15 13:28:40" of the user identifier "a13ab".

The master setting information control unit 502 searches the master setting information management table 800 stored in the master setting information DB 510 for the personal setting information that was updated on or after the last synchronization date/time "2016/01/15 13:28:40" of the user identifier "a13ab". The last update date/time of the user identifier "a13ab" in the MFP 120 is "2016/01/15 13:28:40". The master setting information control unit 502 searches for a set of the target 801, keys 802, and value 803 that contains the target 801 indicating "a13ab" and the last update date/time 804 coinciding with or following "2016/01/15 13:28:40".

Figure 8B:
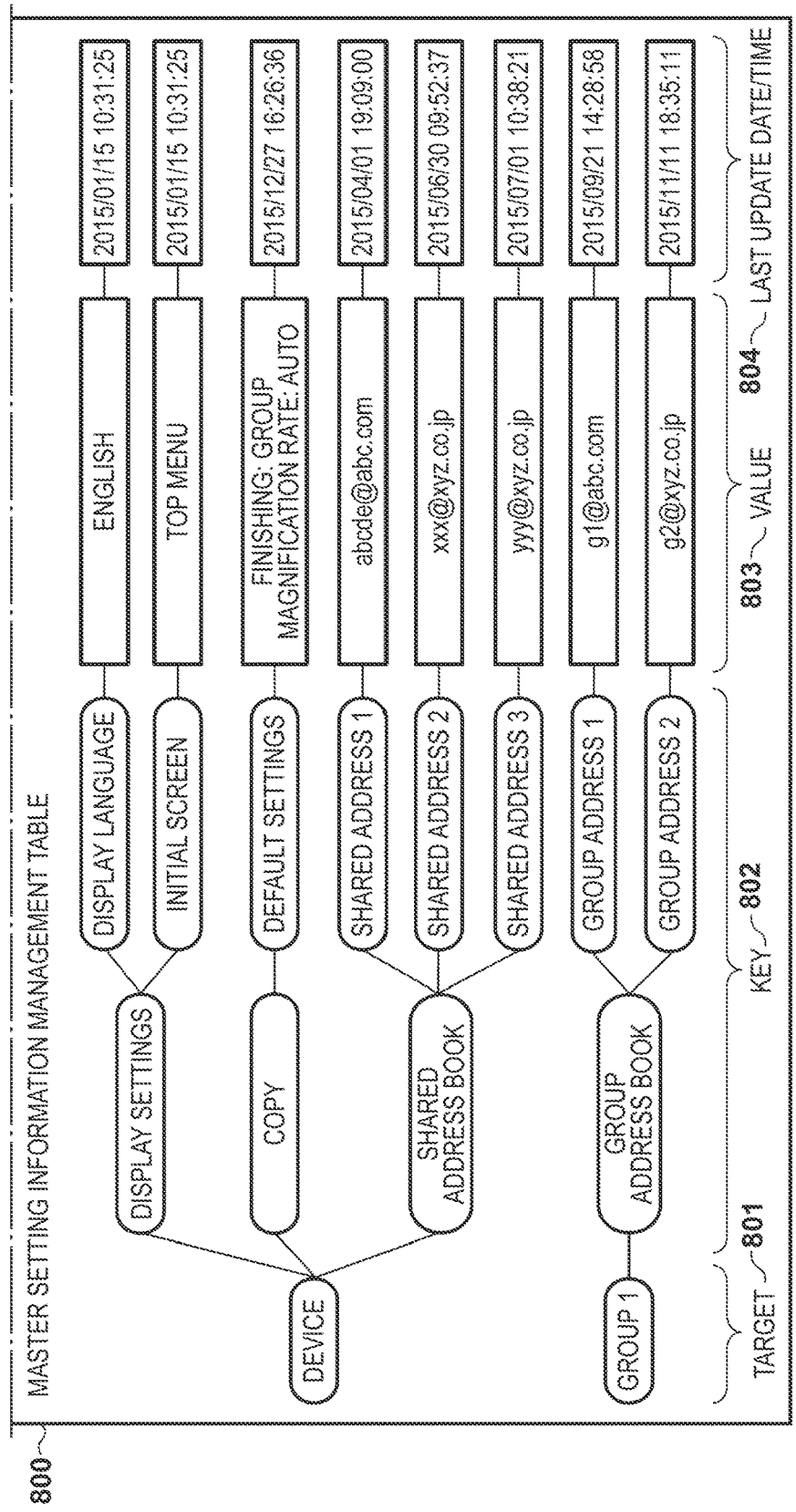

In the example of FIGS. 8A and 8B, the master setting information control unit 502 searches for a set of the target 801 "User A (a13ab)", the keys 802 "display settings—initial screen", and the value 803 "copy". When there are a plurality of sets that match the condition, the master setting information control unit 502 searches for the plurality of sets. On the other hand, when there is no data that was updated on or after the designated last synchronization date/time, the master setting information control unit 502 yields no search result.

The master setting information control unit 502 transmits, to the communication control unit 503, information of the searched set of the target 801, keys 802, and value 803, and the date and time of the execution of the search processing. It will be assumed that the date and time of the execution of the search processing by the master setting information control unit 502 is 2016/03/16 13:41:59 by way of example.

The communication control unit 503 transmits, to the MFP 120, information of the user identifier, keys, value, and the date and time of the search corresponding to the information received from the master setting information control unit 502. In the present embodiment, the information transmitted to the MFP 120 contains the user identifier "a13ab", the keys "display settings—initial screen", the value "copy", and the date and time of the search "2016/03/16 13:41:59".

In the MFP 120, the communication control unit 404 receives the information of the user identifier, the keys, the value, and the date and time of the search from the setting value management server 110, and analyzes the received information. The communication control unit 404 passes, to the setting information control unit 403, the information of the user identifier (a13ab), the keys (display settings—initial screen), the value (copy), and the date and time of the search (2016/03/16 13:41:59) received from the setting value management server 110. Then, the communication control unit 404 instructs the setting information control unit 403 to update personal setting information.

Based on the information passed from the communication control unit 404, the setting information control unit 403 updates personal setting information stored in the setting information management table 600 stored in the setting information DB 420. The setting information control unit 403 updates, for example, the value corresponding to the user identifier (a13ab) and the keys (display settings—initial screen) received from the communication control unit 404 using the received value (copy). The setting information control unit 403 updates, for example, the value 603 corresponding to the target 601 containing (a13ab) and the keys 602 indicating (display settings—initial screen) using the value (copy).

Furthermore, the communication control unit 404 changes the last synchronization date/time of the user identifier "a13ab" in the registered user management table 700 stored in the setting information DB 420 to the date and time of the search (2016/03/16 13:41:59) in the setting value management server 110.

In the above-described manner, personal setting information of the user A of the MFP 120a is updated through synchronization with the latest state of the setting value management server 110. The setting information control unit 403 passes the personal setting information of the user A to the functional constituent elements corresponding to the functions of the MFP 120a, and transfers control to the display operation control unit 401. The display operation control unit 401 displays a post-login screen that reflects the personal setting information of the user identifier "a13ab".

The above-described processing is one example of processing in which the MFP 120 obtains the latest personal setting information of a user stored in the setting value management server 110 when the user logs into the MFP 120. Also, the MFP 120 may, for example, instruct the setting value management server 110 to explicitly synchronize the personal setting information, and obtain the latest setting information from the setting value management server 110 at a timing other than the time of the login. Furthermore, the setting value management server 110 may, for example, instruct the MFP 120 to explicitly synchronize the personal setting information, and the setting value management server 110 may transmit the latest personal setting information to the MFP 120.

(Processing for Registering and Updating Personal Setting Information)

Next, a description will be given of processing in which the setting value management server 110 registers and updates personal setting information of a user updated in the MFP 120. In the processing described below, it will be assumed that the processing for allowing the user with the user identifier "a13ab" to log into the MFP 120, which has been described in connection with the processing for obtaining personal setting information, has already been completed. When this user performs an operation to change personal setting information of this user via the touchscreen 218, the setting information control unit 403 changes the personal setting information of this user based on the performed operation.

The setting information control unit 403 changes the personal setting information through, for example, the following processing. Specifically, the setting information control unit 403 changes the personal setting information based on a user operation via a non-illustrated personal setting information changing screen that is used in changing the personal setting information and displayed by the display operation control unit 401. For example, the setting information control unit 403 changes an initial screen displayed after the login and changes a print setting for copy to a double-sided print setting based on information of this user operation. The personal setting information changing screen is, for example, a screen that includes the names of setting items that can be changed, radio buttons indicating a plurality of options for setting information corresponding to the setting items, etc. By selecting one of the plurality of radio buttons indicating an option for a certain setting item within the personal setting information changing screen, the user can change setting information related to that setting item.

With regard to a functional constituent element for which the personal setting information was changed, the display operation control unit 401 passes the user identifier "a13ab"

that made the change and a value designated by the user to the setting information control unit 403. Here, the value designated by the user is, for example, a set of keys 602 and a value 603. By way of example, assume that the user with the user identifier "a13ab" designated "personal address book—personal address 1" as the keys 602, and "xxx@yyy.co.jp" as the value 603. The setting information control unit 403 confirms whether the user identifier "a13ab" exists in the registered user management table 700. If the user identifier "a13ab" does not exist in the registered user management table 700, the setting information control unit 403 registers information of the user with the user identifier "a13ab" with the registered user management table 700. At this time, the setting information control unit 403 registers a user identifier 701, a user name 704, a domain name 705, and a last login date/time 706 of the registered user, but leaves other items blank (or places a value 0 in other items) as they are unconfirmed. In the example of FIG. 7, as the user identifier "a13ab" is registered with the registered user management table 700, the setting information control unit 403 does not newly register the user.

Furthermore, the setting information control unit 403 confirms whether the keys 602 designated by the user (personal address book—personal address 1) exists in personal setting information corresponding to the target 601 "a13ab" stored in the setting information management table 600. If the setting information control unit 403 has confirmed that they do not exist, it registers the keys 602 (personal address book—personal address 1) with the personal setting information corresponding to the target 601 "a13ab". In the example of FIGS. 6A and 6B, as the keys 602 "personal address book—personal address 1" are registered with the personal setting information corresponding to the target 601 "a13ab", the setting information control unit 403 does not newly register the keys 602.

Then, the setting information control unit 403 updates the value 603 corresponding to the target 601 "a13ab" and the keys 602 "personal address book—personal address 1" within the setting information management table 600 using "xxx@yyy.co.jp" designated by the user. In the example of FIGS. 6A and 6B, the setting information control unit 403 changes the value 603 corresponding to the target 601 "a13ab" and the keys 602 "personal address book—personal address 1" from "aaa@abc.com" to "xxx@yyy.co.jp". If the value of the target 601 and the keys 602 designated by the user does not exist in the setting information management table 600, the setting information control unit 403 newly registers the designated information.

Upon completion of the processing for updating the setting information management table 600, the setting information control unit 403 gives a response to the functional constituent element that requested the update to the effect that the update has been completed. The setting information control unit 403 also transmits, to the setting value management server 110, information indicating that the value corresponding to "personal address book—personal address 1" of the user identifier "a13ab" is "xxx@yyy.co.jp". Then, the setting information control unit 403 instructs the setting value management server 110 to update setting information managed by the setting value management server 110 based on the transmitted information.

The communication control unit 404 executes the following processing using the communication I/F controller 217 via the network 100. The communication control unit 404 transmits, to the setting value management server 110, an instruction for updating the value corresponding to the keys "personal address book—personal address 1" of the user identifier "a13ab" to "xxx@yyy.co.jp".

The communication control unit 503 of the setting value management server 110 receives the instruction for updating setting information from the MFP 120. The communication control unit 503 analyzes the received request. Then, the communication control unit 503 instructs the master setting information control unit 502 to update the value 803 corresponding to the keys 802 "personal address book—personal address 1" of the target 801 "a13ab" in the master setting information management table 800 to "xxx@yyy.co.jp". In the master setting information management table 800 of the master setting information DB 510, the master setting information control unit 502 updates the value 803 corresponding to the target 801 (a13ab) and the keys 802 (personal address book-personal address 1) to "xxx@yyy.co.jp". This update is processing that is similar to updating of the setting information management table 600 in the MFP 120.

After updating the personal setting information corresponding to the target 801 (a13ab) in the master setting information management table 800, the master setting information control unit 502 executes the following processing. Specifically, the master setting information control unit 502 obtains the current time in the setting value management server 110, and adds information of the obtained time to the last update date/time 804 corresponding to the updated value 803. The master setting information control unit 502 transmits information indicating that the update processing has been completed to the communication control unit 503. The communication control unit 503 transmits information indicating that the update processing in the setting value management server 110 has been completed to the MFP 120.

Upon receiving the information indicating that updating of the personal setting information has been completed from the setting value management server 110, the communication control unit 404 of the MFP 120 completes the update processing. On the occurrence of an error in the processing for registering, updating, and obtaining setting information, the MFP 120 and the setting value management server 110 may execute processing that has been set as error processing. For example, on the occurrence of the error, the MFP 120 and the setting value management server 110 may perform error display on their respective display units.

<Login Screen>

Next, an example of a login screen 900 that is used by a user to log into the MFPs 120 according to the present embodiment will be described with reference to FIG. 9. To accept a user login, the display operation control unit 401 displays the login screen 900 on the display 219.

The login screen 900 is composed of a user name input form 901, a password input form 902, and a login button 903. The user inputs a user name to the user name input form 901 and a password to the password input form 902 via the touchscreen 218 and the like, and then selects the login button 903.

Upon detecting the selection of the login button 903, the authentication control unit 402 obtains the character strings input to the user name input form 901 and the password input form 902 from the display operation control unit 401, and executes user authentication processing based on the obtained character strings. It goes without saying that an authentication method is not limited to this, and may be another authentication method, such as a mode in which user information is obtained from a non-contact IC card. Furthermore, it is permissible to provide an external server that executes the authentication separately, notify the external server of the obtained user information, and receive the result of the authentication executed by the external server.

<Main Menu Screen>

Next, an example of a main menu screen according to the present embodiment will be described with reference to FIG. 10. Once the user login has been confirmed, the display operation control unit 401 displays a main menu screen 1000 on the display 219.

The main menu screen 1000 is composed of link buttons 1001a to 1001h to the respective applications of the MFPs 120. That is to say, the link buttons 1001a to 1001h are buttons for selecting the services that are to be provided by the MFPs 120 to the user who has logged in. The display operation control unit 401 accepts an operation performed on these link buttons via the touchscreen 218. Note that each of these applications may be selectable via, for example, a direction key and a confirmation key of hardware buttons that are provided separately. For example, when the link button 1001a to a copy application has been selected, a later-described copy screen 1100 is displayed on the display 219. Furthermore, display may be performed in such a manner that selectable applications change depending on the authority and restriction information of the user who has logged in. In this case, link buttons corresponding to the applications that cannot be currently used by the user who has logged in may be displayed in a non-selectable state, for example, displayed in gray.

Furthermore, a left menu 1002 is composed of a user information display area 1003 and a shortcut button 1004 to each application. The user information display area 1003 is an area that displays user identifier information of the user who has successfully logged in via the login screen 900. The example of FIG. 10 depicts that the "user B" is currently logged in. Similarly to the link buttons 1001a to 1001h to the respective applications, the shortcut button 1004 enables a transition to each function screen when selected. In the example of FIG. 10, the shortcut button 1004 is registered as a shortcut button; however, there may be a plurality of shortcut buttons that can be registered with the left menu 1002.

<Copy Screen>

Figure 11:
FIG. 11 is a diagram showing examples of a copy screen according to an embodiment.

Next, examples of a copy screen according to an embodiment of the present invention will be described with reference to FIG. 11. For example, when the link button 1001a has been selected on the main menu screen 1000, the display operation control unit 401 displays copy screens 1100, 1110 on the display 219.

On the copy screens 1100, 1110, a user can designate output-related print settings, such as imposition on a sheet, settings of finishers (e.g., a stapler), and settings of image quality (e.g., density). In the screen examples of FIG. 11, keys for which settings have been configured are displayed in a highlighted state by way of example. Note that a description of the modes that are not directly relevant to the present invention will be omitted.

The screen 1100 is one example of a copy screen that does not reflect setting values of copy default settings of the user B managed by the setting value management server 110. 1101 is a finishing key, and is a function that supports finishing, such as sorting and stapling of output copies. On the screen 1100, "group" has been set with respect to the finishing function, and the key is displayed in a highlighted state.

The screen 1110 is a copy screen in a state where, among setting information managed by the setting value management server 110, the setting values of the copy default settings of the user B have been synchronized with the MFPs 120, and the display 219 reflects the setting information. 1102 is a double-sided key, and is used to set a double-sided mode. On the screen 1110, "double-sided to double-sided" has been set as the double-sided mode, and the key is displayed in a highlighted state. 1103 is an original type key, and is used to select an original type corresponding to an original and change image processing for the sake of the optimal image reproduction. On the screen 1110, "characters" has been set as an original type mode, and the key is displayed in a highlighted state.

According to the present embodiment, for example, when the user who has logged in is the user B as described above, the screen 1110 is displayed on the display 219 in a quick and favorable manner without inhibiting a user operation. For example, if setting information that is specific to the user B and has been obtained from the setting value management server 110 is reflected in the copy screen at the stage where a user operation has begun, such as during an operation to configure copy settings, then the user operation that has been performed up to that point will be wasted. Or, a copy result that is not intended by the user will be output. To avoid such operations and settings that are not intended by the user, the MFPs 120 according to the present embodiment perform the following control.

<Synchronization Control>

Figure 12:
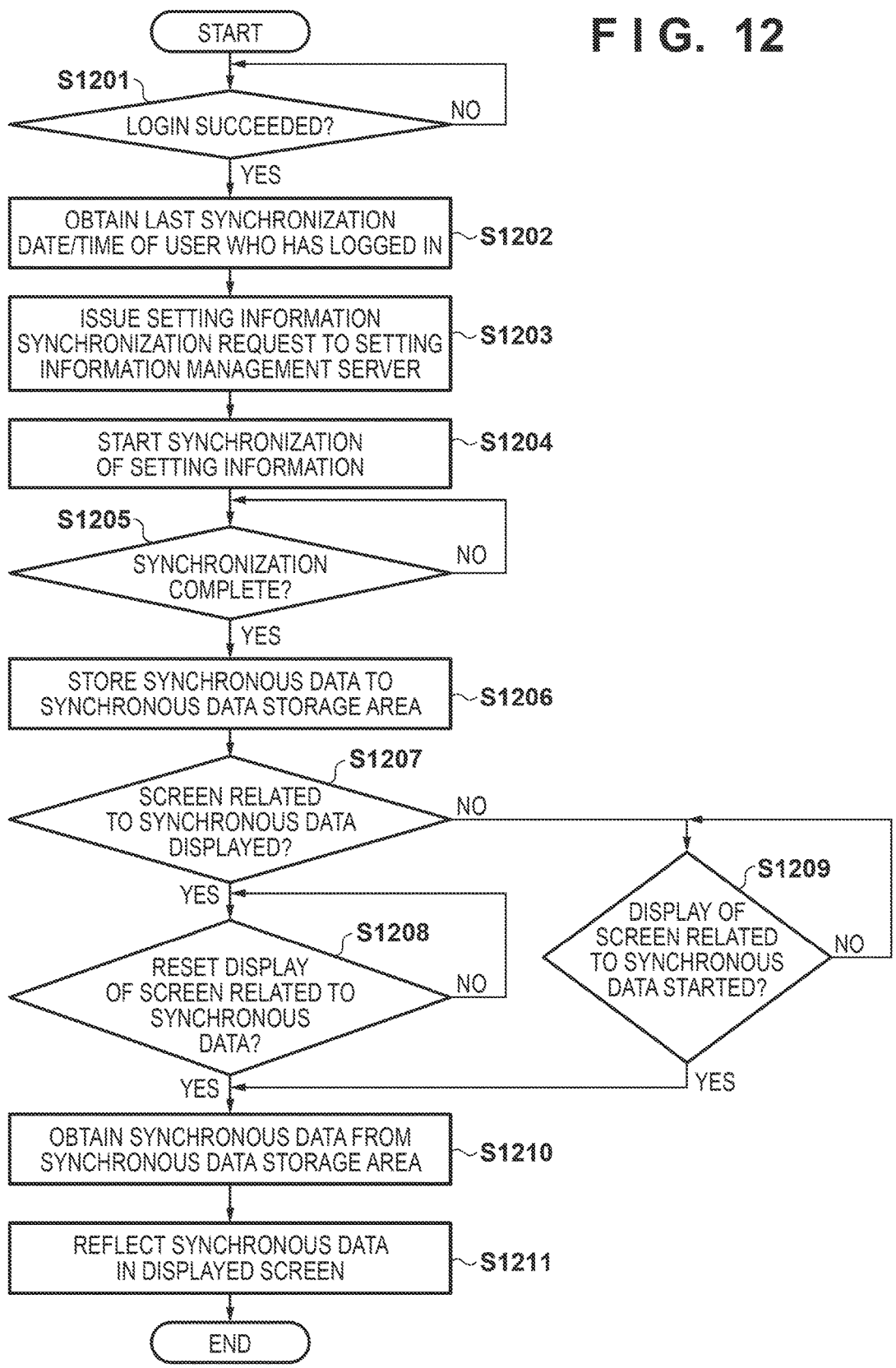
FIG. 12 is a flowchart showing an example of processing of the MFPs related to the system according to an embodiment.

Next, with reference to FIG. 12, a description will be given of processing for synchronizing setting information in the MFPs 120 in accordance with the setting value management server 110 according to an embodiment of the present invention. Specifically, a description will be given of exemplary processing for, while the user B is logged in, synchronizing copy default settings that were updated on or after the last synchronization date/time from among the master setting information management table 800 managed by the setting value management server 110 with the MFP 120, and reflecting them in the presentation on the display 219. Each operation shown in a flowchart of FIG. 12 is realized by the execution of a control program by the CPU 211 of the MFPs 120. The present flowchart is started in a state where a user operation can be accepted from the touchscreen 218 via the input control I/F 214.

In step S1201, the CPU 211 accepts a user authentication operation from the login screen 900 displayed on the display 219 using the display operation control unit 401, and determines whether a login has succeeded using the authentication control unit 402. It proceeds to the process of step S1202 if the login has succeeded. On the other hand, it returns to step S1201 and repeats the process thereof if the login has failed.

In step S1202, with the use of the setting information control unit 403, the CPU 211 obtains, from the registered user management table 700 stored in the setting information DB 420, information of the last synchronization date/time 702 corresponding to the user identifier 701 that is identical to the user identifier authenticated in step S1201. For example, if the login of the user B succeeded in step S1201, "2016/02/01 17:53:31" is obtained as the last synchronization date/time 702 corresponding to the user identifier 3c85e in the registered user management table 700 in step S1202.

In step S1203, with the use of the setting information control unit 403, the CPU 211 issues a personal setting information synchronization request to the setting value management server 110 via the communication control unit 404. The communication control unit 404 transmits, for example, an obtainment request for information of the last synchronization date/time 702 of the user B obtained in step S1202 to the setting value management server 110.

In step S1204, with the use of the communication control unit 404, the CPU 211 receives setting information for which the obtainment request was issued in step S1203 from the setting value management server 110, and starts synchronization in the MFPs 120. The received setting information is stored to the setting information DB 420 via the setting information control unit 403 of the MFPs 120. Specifically, the value 803 "color mode: monochrome, double-sided: double-sided→double-sided, original type: characters" corresponding to the keys 802 (copy-default settings) in the master setting information management table 800 is received from the setting value management server 110, and stored to the setting information DB 420 of the MFPs 120.

In step S1205, with the use of the setting information control unit 403, the CPU 211 determines whether the synchronization in the MFPs 120 in accordance with the setting value management server 110 has been completed. It proceeds to the process of step S1206 if the synchronization has been completed. On the other hand, if the synchronization has not been completed, the process of step S1205 is repeated until the synchronization is completed.

In step S1206, with the use of the setting information control unit 403, the CPU 211 reads out the setting information that was stored to the setting information DB 420 through the process of synchronization in the MFPs 120 in step S1204, and stores the setting information to a temporary storage area for setting information. The temporary storage area for setting information is an area that temporarily stores setting information to be referred to in reflecting setting information in the display 219. The temporary storage area for setting information may be secured using the storage apparatus 220, RAM 212, or ROM 213. Specifically, the setting information control unit 403 reads out copy default settings for the user B that were stored to the setting information DB 420 in the process of step S1204, and stores them to the temporary storage area for setting information.

In step S1207, with the use of the setting information control unit 403, the CPU 211 confirms whether the display 219 displays a screen related to the synchronized setting information at the time of completion of the synchronization in step S1205. It proceeds to the process of step S1208 if the screen related to the synchronized setting information has been displayed. On the other hand, it proceeds to the process of step S1209 if the screen related to the synchronized setting information is not displayed.

In confirming the display of the screen related to the synchronized setting information, the determination is made based on whether the screen displayed on the display 219 matches the category of the keys 602 of the synchronized setting information in the setting information management table 600. Specifically, in a case where the setting information synchronized in step S1205 is the copy default settings, as the category of the keys 602 is "copy", the setting information control unit 403 determines whether the screen displayed on the display 219 belongs to the "copy" category. For example, when the display 219 displays the copy screen 1100 at the time of completion of the synchronization, the process of step S1208 follows because the category of a screen related to copy functions is determined as "copy". On the other hand, when the display 219 displays the main menu screen 1000, it is determined that this screen does not belong to the "copy" category as it is not a screen related to a copy application, and the process of S1209 follows. Although the copy screen 1100 is used herein as a display screen related to the copy default settings, which are the synchronized setting information, the display related to the synchronized setting information is not limited to this one screen, and may be another screen.

In step S1208, with the use of the display operation control unit 401, the CPU 211 determines whether an operation to reset the display of the screen was performed during the display of the screen related to the synchronized setting information. It proceeds to the process of step S1210 if the reset operation was performed. On the other hand, if the reset operation was not performed, the process of step S1208 is repeated. Here, the reset operation denotes an operation to restore setting information reflected in the display 219 to initial values. For example, the reset operation denotes an operation to automatically set the values of the setting information to the initial values after the user has pressed a reset key provided in a non-illustrated operation unit of the MFPs 120 or a certain period has elapsed. Although the pressing of the reset key has been described herein by way of example, it is not intended to limit the present invention, and a predetermined operation performed by the user may be used as an operation corresponding to the above-described pressing of the reset key. That is to say, in the present invention, if the screen related to the synchronized setting information (herein, the copy screen) has been already displayed at the timing of completion of the synchronization, then a transition will be made to the processes of later-described steps S1210 and S1211 for accepting a predetermined operation performed by the user and reflecting the synchronized setting information. Because there is a possibility that the user has already performed a setting operation via the displayed screen, the user operation is used as a trigger in order to avoid unintended operations and settings. Therefore, a trigger to reflect the synchronized setting information need not be limited to the pressing of the reset key, which has been described merely as one example.

In step S1209, with the use of the display operation control unit 401, the CPU 211 determines whether the display of the screen related to the synchronized setting information, that is to say, the copy screen herein, has been started. It proceeds to the process of step S1210 if the display of the screen related to the synchronized setting information has been started. On the other hand, if the display of the screen related to the synchronized setting information has not been started, the process of step S1209 is repeated. Specifically, if the copy screen 1100 related to the copy default settings, which are the synchronized setting information, is displayed due to the user's selection of the link button 1001a during the display of the main menu screen 1000, the process of step S1210 will follow. On the other hand, if the display of the copy screen 1100 has not been started, the process of step S1209 is repeated. Here, as the screen related to the synchronized setting information has been not displayed at the timing of completion of the synchronization, there is no need to use a predetermined operation performed by the user as a trigger as in step S1208. Therefore, as it is sufficient to reflect the synchronized setting information when the screen related to the synchronized setting information is newly displayed, the display timing of this screen is determined rather than detecting a user operation.

In step S1210, with the use of the setting information control unit 403, the CPU 211 obtains the setting information that was stored to the temporary storage area for setting information in step S1206. Subsequently, in step S1211, with the use of the display operation control unit 401, the CPU 211 displays a copy screen that reflects the synchronized setting information obtained in step S1210 on the display 219, and ends the processing. Specifically, the copy screen 1110 is displayed that reflects, in the display 219, the copy default settings "color mode: monochrome, double-sided: double-sided→double-sided, original type: characters" of the "user B" obtained from the temporary storage area for setting information. Note that in step S1210, it is preferable that the CPU 211 deletes the obtained setting information from the temporary storage area upon completion of the reflection.

As described above, the present information processing apparatuses obtain synchronous data related to an authenticated user from the setting value management server 110, which is an external apparatus, and upon completion of the obtainment of the synchronous data, determine whether a screen related to the synchronous data (e.g., a function setting screen) has been displayed on the display unit. Furthermore, if the screen related to the synchronous data has been displayed on the display unit, the information processing apparatuses reflect the synchronous data in this screen upon accepting a predetermined operation from the user. On the other hand, if the screen related to the synchronous data is not displayed on the display unit, the information processing apparatuses reflect the synchronous data when displaying the screen on the display unit. In this way, in a system that can obtain setting information corresponding to a user from an external apparatus, the setting information can be reflected in a quick and favorable manner without inhibiting a user operation. Although the system related to copy setting information has been described above, synchronization processing for other setting information can be controlled in a similar way.

Second Embodiment

Figure 13:
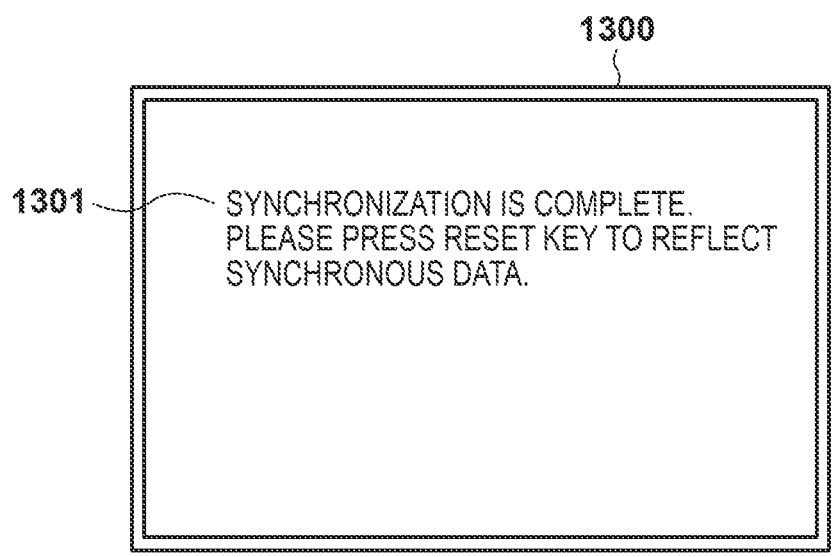
FIG. 13 is a diagram showing an example of a notification screen according to an embodiment.

The following describes a second embodiment of the present invention. The present embodiment adopts a configuration that notifies a user of a timing of completion of synchronization in addition to the configurations according to the above-described first embodiment. First, with reference to FIG. 13, a description will be given of an example of a notification screen that is displayed at the time of completion of synchronization in the MFPs 120 in accordance with the setting value management server 110 according to the present embodiment.

A notification screen 1300 is a screen that is displayed on the display 219 at a timing of completion of synchronization of setting information, and is intended to notify the user of the completion of synchronization. A message display area 1301 is an area that displays a message for notifying the user of the completion of synchronization and a timing at which synchronized data is reflected in the presentation on the display 219. Here, the notification indicates that pressing the reset key will reflect synchronous data. Although the pressing of the reset key is used herein as a trigger to reflect synchronous data by way of example, the trigger is not intentionally limited to this operation, and a method that reflects the user's will can be used, similarly to the above-described first embodiment.

<Control to Display Notification Screen>

Figure 14:
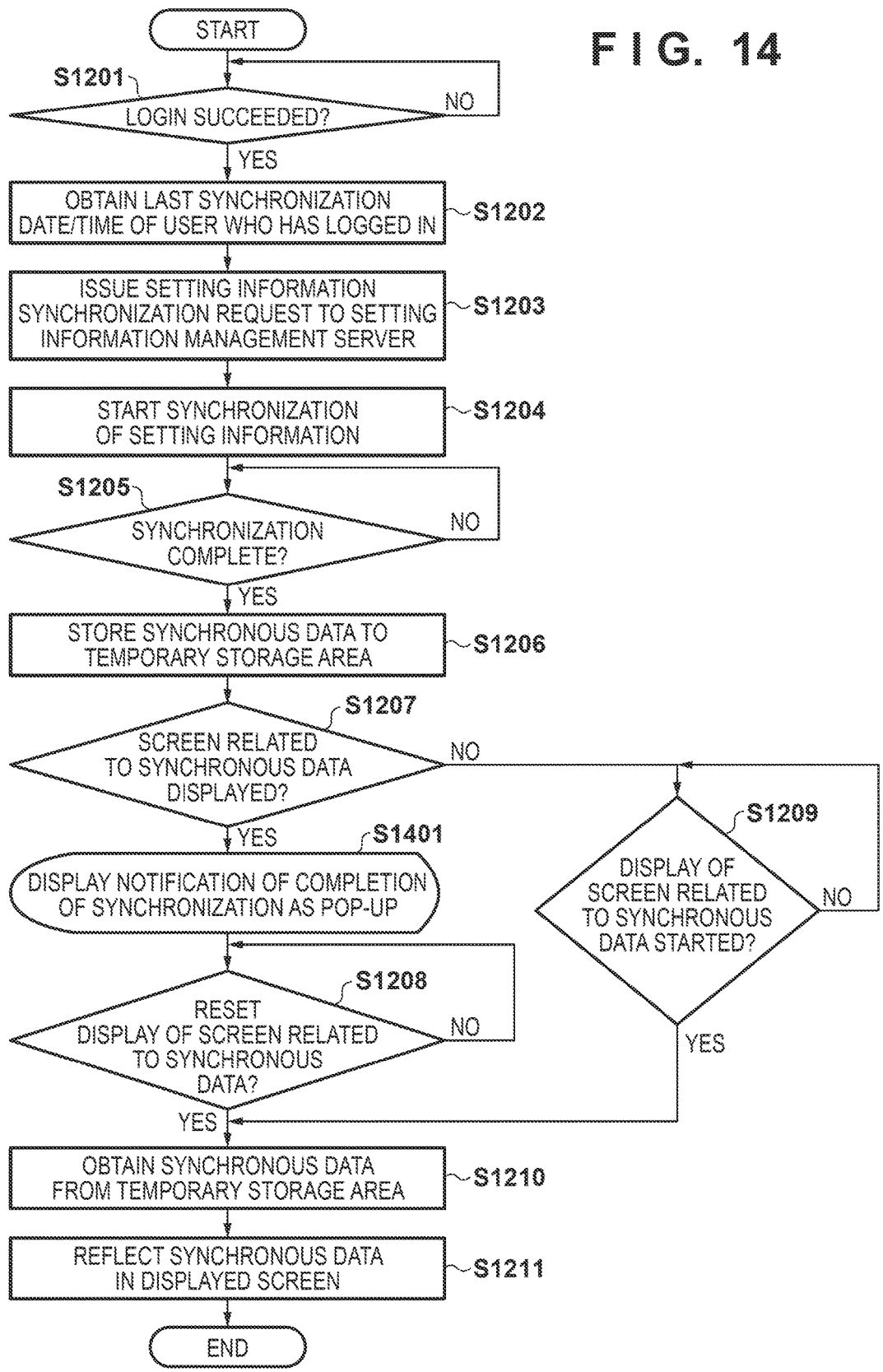
FIG. 14 is a flowchart showing an example of processing of the MFPs for giving notification of completion of synchronization in the system according to an embodiment.

Next, with reference to FIG. 14, a description will be given of a processing procedure for displaying the notification screen 1300 on the display 219 when a screen related to synchronized setting information has been displayed at the time of completion of synchronization in addition to the above-described first embodiment. Each operation shown in a flowchart of FIG. 14 is realized by the execution of a control program by the CPU 211 of the MFPs 120. Hereinafter, the processes that are similar to those in the flowchart of FIG. 12 according to the above-described first embodiment will be given the same step numbers thereas, and a description thereof will be omitted.

If it is determined that the display 219 displays the screen related to the synchronized setting information at the time of completion of synchronization in step S1207, the process of step S1401 will follow. In step S1401, with the use of the display operation control unit 401, the CPU 211 displays the notification screen 1300 on the display 219. Specifically, the display operation control unit 401 displays the notification screen 1300 over the copy screen 1100 if the synchronized setting information is copy default settings and the display 219 displays the copy screen 1100 as the screen related to the synchronized setting information. The notification screen 1300 includes a non-illustrated close button, and control may be performed to close the notification screen 1300 upon selection of the close button. Alternatively, control may be performed to close the notification screen 1300 automatically after the notification screen 1300 is displayed for a certain period.

As described above, the MFPs 120 according to the present embodiment further display the notification screen 1300, which notifies a user of the completion of synchronization of setting information, at the time of the completion of synchronization in addition to the configuration according to the above-described first embodiment. In this way, control can be performed in better conformity with the user's intention. Although the present embodiment has described the system related to copy setting information by way of example, synchronization processing for other setting information may be executed in a similar way.

Third Embodiment

The following describes a third embodiment of the present invention. The above-described embodiments have described processing in which setting information is not immediately reflected when a user is performing an operation at the time of completion of synchronization of the setting information, and the synchronized setting information is reflected at the time of resetting the user operation. In a specific example, in a case where copy default settings have been synchronized in the MFFs 120, the synchronized copy default settings are not reflected while a copy-related operation is being performed with respect to the copy screen 1100 displayed on the display 219, and the reflection is implemented when the user has performed a reset operation. In this way, setting information can be reflected quickly without inhibiting a user operation.

Meanwhile, some setting information should be reflected immediately even during a user operation. For example, if setting information related to a display language is not reflected immediately at the time of completion of synchronization, the user needs to continue the operation in an unfamiliar language, which is inconvenient. Therefore, it is desirable to immediately reflect setting information related to a display language and the like in the operation unit at the time of completion of synchronization. In view of this, the present embodiment determines whether the synchronized setting information is of a type targeted for immediate reflection; if it should be immediately reflected, it is immediately reflected in the operation unit at the time of completion of synchronization, and if it should not be immediately reflected, it is reflected at the time of, for example, resetting the operation similarly to the above-described embodiments.

<Selection Screen for Immediate Reflection>

First, with reference to FIG. 15, a description will be given of an example of a selection screen according to the present embodiment for selecting whether to immediately reflect setting information in accordance with a user operation. A selection screen 1500 is a screen for letting a user select between an enabled state and a disabled state, on a per-item basis, regarding a synchronization timing: immediately reflect the synchronized setting information in the display 219, or reflect the synchronized setting information when the user has performed a predetermined operation. Items 1501 and 1502 are setting information targeted for immediate reflection. Although a display language and accessibility are respectively used as the examples of the item 1501 and the item 1502 in the example of FIG. 15, other items may exist. Furthermore, it will be assumed that immediate reflection is set to OFF with respect to the items that are not displayed on this screen.

For each of the items 1501 and 1502, ON (enabled) or OFF (disabled) of immediate reflection can be selected. Furthermore, there may be a mode in which ON or OFF is selected collectively for the items. The example of FIG. 15 depicts a state where immediate reflection ON is selected for the item 1501. Furthermore, in the depicted state, immediate reflection OFF is selected for the item 1502. When ON is selected, control for performing reflection immediately at the timing of completion of synchronization is selected as the synchronization timing. On the other hand, when OFF is selected, control for performing synchronization upon accepting a predetermined operation, specifically the pressing of the reset key herein, from the user after the completion of synchronization is selected as the synchronization timing. Although a method for letting the user select whether the immediate reflection can be set has been described herein, this may be defined in advance using, for example, a table of setting information to be synchronized.

<Synchronization Control>

Next, with reference to FIG. 16, a description will be given of a processing procedure according to the present embodiment for determining whether setting information is targeted for immediate reflection at the time of completion of synchronization, and performing the immediate reflection or performing the reflection at the time of reset in accordance with the determination result. Each operation shown in a flowchart of FIG. 16 is realized by the execution of a control program by the CPU 211 of the MFPs 120. Hereinafter, the processes that are similar to those in the flowchart of FIG. 12 according to the above-described first embodiment will be given the same step numbers thereas, and a description thereof will be omitted.

If it is determined that the synchronization has been completed in step S1205, the CPU 211 proceeds to step S1601 and determines, with the use of the setting information control unit 403, whether the synchronized setting information is targeted for immediate reflection in the display 219. Specifically, the setting information control unit 403 refers to the synchronization timing of each item selected on the above-described selection screen 1500, and determines whether a target item is targeted for immediate reflection. If the synchronized setting information is not targeted for immediate reflection, the CPU 211 proceeds to the process of step S1206. On the other hand, if the synchronized setting information is targeted for immediate reflection, the CPU 211 proceeds to the process of step S1602. For example, when the item 1501 on the selection screen 1500 is set to ON and the synchronized setting information is a display language, it is determined that the synchronized setting information is targeted for immediate reflection. On the other hand, when the synchronized setting information is copy, it is determined that the synchronized setting information is not targeted for immediate reflection because copy is not defined on the selection screen 1500.

In step S1602, when the synchronized setting information is targeted for immediate reflection, the CPU 211 obtains the setting information from the setting information DB 420 with the use of the setting information control unit 403. Then, the CPU 211 proceeds to the process of step S1211, reflects the synchronized setting information in a display screen (herein, a copy screen) on the display 219, and ends the processing.

As described above, the MFPs 120 according to the present embodiment perform synchronization control by determining, upon completion of synchronization, whether a setting item targeted for synchronization is an item targeted for immediate reflection or to perform synchronization at a timing of acceptance of a predetermined operation from a user. This makes it possible to perform finer synchronization tailored to the setting item. Although the present embodiment has described a "display language" as an example of setting information that should be immediately reflected, other setting information may be used. For example, regarding setting information related to accessibility and the like, as it is difficult to continue an operation in a state where the setting information has not been reflected, the setting information may be immediately reflected at the time of completion of synchronization.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-054874 filed on Mar. 21, 2017 and Japanese Patent Application No. 2018-007592 filed on Jan. 19, 2018, which are hereby incorporated by reference herein in their entirety.

What is claimed is:

1. An information processing apparatus, comprising:
a memory device that stores a set of instructions; and
at least one processor that executes the instructions to:
   authenticate a user;
   obtain synchronous data related to the authenticated user from an external apparatus;
   receive a selection of whether to enable or disable immediate reflection upon completion of synchronization of the obtained synchronous data as a synchronization timing;
   upon completion of synchronization of the synchronous data, determine whether a screen related to the synchronous data has been displayed on a display;
   in a case where the screen related to the synchronous data has been displayed on the display and the synchronization timing is set to enable immediate reflection, reflect the synchronous data immediately on displayed contents of the screen related to the synchronous data;
   in a case where the screen related to the synchronous data has been displayed on the display and the synchronization timing is set to disable immediate reflection, reflect the synchronous data on displayed contents of the screen upon accepting a predetermined operation from the user; and
   in a case where the screen related to the synchronous data has been not displayed on the display, reflect, when displaying the screen on the display, the synchronous data on displayed contents of the screen.

2. The information processing apparatus according to claim 1, wherein the at least one processor executes instructions in the memory device to:
   upon determining that the screen related to the synchronous data has been displayed on the display, indicate on the display that the synchronous data is reflected by completion of synchronization of the synchronous data and performance of the predetermined operation.

3. The information processing apparatus according to claim 1, wherein the at least one processor executes instructions in the memory device to:
   display, on the display, a selection screen for setting whether to enable or disable immediate reflection per item of the synchronous data, and select whether to enable or disable immediate reflection per item in accordance with a user operation input via the selection screen.

4. The information processing apparatus according to claim 1, further comprising:
   a storage unit that stores a table defining last synchronization dates/times on which information related to registered users are synchronized in association with respective identifiers of the registered users,
   wherein the at least one processor executes instructions in the memory device to:
      transmit, to the external apparatus, an identifier of the authenticated user and the last synchronization date/time thereof in the table stored in the storage unit, and obtain, from the external apparatus, synchronous data corresponding to the user updated by the external apparatus after the last synchronization date/time.

5. The information processing apparatus according to claim 4, wherein the at least one processor executes instructions in the memory device to:
   temporarily store synchronous data obtained from the external apparatus to the storage unit.

6. The information processing apparatus according to claim 5, wherein the at least one processor executes instructions in the memory device to:
   reflect the synchronous data temporarily stored in the storage unit using the synchronous data, and delete the synchronous data temporarily stored in the storage unit when the synchronous data has been reflected.

7. The information processing apparatus according to claim 1, wherein
the predetermined operation is pressing of a reset key that resets settings that have been configured by the user via the screen related to the synchronous data.

8. The information processing apparatus according to claim 1, wherein
the information processing apparatus is an image processing apparatus, and
the screen related to the synchronous data is a setting screen for functions provided by the image processing apparatus.

9. A control method for an information processing apparatus, the control method comprising:
authenticating a user;
obtaining synchronous data related to the user authenticated in the authenticating from an external apparatus;
receiving a selection of whether to enable or disable immediate reflection upon completion of synchronization of the obtained synchronous data as a synchronization timing;
upon completion of synchronization of the synchronous data in the obtaining, determining whether a screen related to the synchronous data has been displayed on a display; and
performing control to:
   in a case where the screen related to the synchronous data has been displayed on the display and the synchronization timing is set to enable immediate reflection, reflect the synchronous data immediately on displayed contents of the screen related to the synchronous data;
   in a case where the screen related to the synchronous data has been displayed on the display and the synchronization timing is set to disable immediate reflection, reflect the synchronous data on displayed contents of the screen upon accepting a predetermined operation from the user; and
   in a case where the screen related to the synchronous data is not displayed on the display, reflect, when displaying the screen on the display, the synchronous data on displayed contents of the screen.

10. A non-transitory computer-readable storage medium storing a computer program for causing a computer to execute each step in a control method for an information processing apparatus, the control method comprising:
authenticating a user;
obtaining synchronous data related to the user authenticated in the authenticating from an external apparatus;
receiving a selection of whether to enable or disable immediate reflection upon completion of synchronization of the obtained synchronous data as a synchronization timing;

upon completion of synchronization of the synchronous data in the obtaining, determining whether a screen related to the synchronous data has been displayed on a display; and performing control to:
- in a case where the screen related to the synchronous data has been displayed on the display and the synchronization timing is set to enable immediate reflection, reflect the synchronous data immediately on displayed contents of the screen related to the synchronous data;
- in a case where the screen related to the synchronous data has been displayed on the display and the synchronization timing is set to disable immediate reflection, reflect the synchronous data on displayed contents of the screen upon accepting a predetermined operation from the user; and
- in a case where the screen related to the synchronous data is not displayed on the display, reflect, when displaying the screen on the display, the synchronous data on displayed contents of the screen.

* * * * *